(12) United States Patent
Horn et al.

(10) Patent No.: US 10,051,686 B2
(45) Date of Patent: Aug. 14, 2018

(54) CHARGING OVER A USER-DEPLOYED RELAY

(71) Applicant: QUALCOMM Incorporated, San Diego, CA (US)

(72) Inventors: Gavin B. Horn, La Jolla, CA (US); Miguel Griot, La Jolla, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 13/831,408

(22) Filed: Mar. 14, 2013

(65) Prior Publication Data
US 2013/0294327 A1   Nov. 7, 2013

Related U.S. Application Data

(60) Provisional application No. 61/643,094, filed on May 4, 2012.

(51) Int. Cl.
*H04W 4/24* (2018.01)
*H04W 88/04* (2009.01)
(Continued)

(52) U.S. Cl.
CPC ......... *H04W 88/04* (2013.01); *H04L 63/0272* (2013.01); *H04W 4/24* (2013.01); *H04W 12/02* (2013.01); *H04L 12/1425* (2013.01)

(58) Field of Classification Search
CPC ... H04W 88/04; H04W 28/021; H04W 52/46; H04W 84/18–84/22; H04W 4/26; H04W 4/24; H04L 12/1442
See application file for complete search history.

(56) References Cited

U.S. PATENT DOCUMENTS 7,756,040 B1 *  7/2010  Andriantsiferana et al. . 370/236
2005/0197098 A1 *  9/2005  Trossen ........................ 455/406
(Continued)

FOREIGN PATENT DOCUMENTS

CN   101176330 A   5/2008
CN   102301794 A   12/2011
(Continued)

OTHER PUBLICATIONS

International Search Report and Written Opinion—PCT/US2013/032862—ISA/EPO—dated Sep. 26, 2013.
(Continued)

*Primary Examiner* — Hoon J Chung
(74) *Attorney, Agent, or Firm* — Arent Fox, LLP

(57) ABSTRACT

Network entities in a wireless network cooperate to account and charge for data communicated over the wireless network. Accounting and charging enable the network entities to properly allocate charges to a second user equipment that communicates through a first user equipment, which acts as a relay in the wireless network. A network entity receives a request from the first user equipment related to a packet data network connection relating to the second user equipment. The network entity establishes or modifies a connection between a gateway and the first user equipment in response to the request. Charges for the data may be allocated to the second user equipment for data communicated with the identifier of the second user equipment.

16 Claims, 22 Drawing Sheets

(51) Int. Cl.
*H04L 29/06* (2006.01)
*H04W 12/02* (2009.01)
*H04L 12/14* (2006.01)

(56) References Cited

U.S. PATENT DOCUMENTS

| | | | |
|---|---|---|---|
| 2006/0031515 A1* | 2/2006 | Van Gassel et al. | 709/227 |
| 2009/0129342 A1* | 5/2009 | Hwang | H04W 36/0022 370/331 |
| 2009/0175215 A1 | 7/2009 | Chen et al. | |
| 2010/0046418 A1* | 2/2010 | Horn | H04W 40/22 370/315 |
| 2010/0165893 A1* | 7/2010 | Edwards | H04B 7/15557 370/280 |
| 2011/0185397 A1 | 7/2011 | Escott et al. | |
| 2011/0188397 A1 | 8/2011 | McCann et al. | |
| 2011/0249609 A1* | 10/2011 | Brusilovsky | H04B 7/15521 370/315 |
| 2012/0020318 A1* | 1/2012 | Naoe | H04W 8/26 370/329 |
| 2012/0044949 A1 | 2/2012 | Velev et al. | |
| 2012/0140701 A1 | 6/2012 | Huang | |
| 2012/0170512 A1 | 7/2012 | Gleixner et al. | |
| 2012/0264375 A1* | 10/2012 | Shankaranarayanan | 455/41.2 |
| 2013/0016630 A1* | 1/2013 | Bhushan | H04W 48/12 370/255 |
| 2013/0029588 A1 | 1/2013 | Bienas et al. | |
| 2014/0080492 A1* | 3/2014 | Shoshan | H04W 40/22 455/449 |

FOREIGN PATENT DOCUMENTS

| | | |
|---|---|---|
| CN | 102362515 A | 2/2012 |
| EP | 2427021 A1 | 3/2012 |
| JP | 2005513931 A | 5/2005 |
| JP | 2006505987 A | 2/2006 |
| JP | 2007336090 A | 12/2007 |
| JP | 2008219643 A | 9/2008 |
| JP | 2010258921 A | 11/2010 |
| JP | 2012523146 A | 9/2012 |
| WO | 03055246 A1 | 7/2003 |
| WO | 2004043008 A1 | 5/2004 |
| WO | WO2010109902 A1 * | 9/2010 ............. H04W 8/26 |
| WO | 2010112236 A1 | 10/2010 |
| WO | 2011091375 A1 | 7/2011 |
| WO | 2012147270 A1 | 11/2012 |

OTHER PUBLICATIONS

Partial International Search Report—PCT/US2013/032862—ISA/EPO—dated Jul. 16, 2013.

Fangfang W., "The Applications of WLAN Technology in the Hefei Unicom Network," Database of Excellent Master Degree Papers of China, Mar. 15, 2012.

SA3: Living Document on "Key Security Issues of Relay Node Architectures", 3GPP TSG-SA WG3#59 S3-100656, Jun. 4, 2010, 16 Pages, URL: http://www.3gpp.org/ftp/tsg_sa/WG3_Security/TSGS3_59_Lisbon/Docs/S3-100656.zip.

* cited by examiner

CHARGING OVER A USER-DEPLOYED RELAY

CROSS-REFERENCE TO RELATED APPLICATION(S)

This application claims the benefit of U.S. Provisional Application Ser. No. 61/643,094, entitled "Charging Over a User-deployed Relay" and filed on May 4, 2012, which is expressly incorporated by reference herein in its entirety.

BACKGROUND

Field

The present disclosure relates generally to communication systems, and more particularly, to wireless communications devices that operate as user equipment and relays.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, network entities in a wireless network may cooperate to account and charge for data communicated over the wireless network. Accounting and charging enable the network entities to properly allocate charges to a user equipment (UE) that communicates through another UE that acts as a relay in the wireless network.

In an aspect of the disclosure, one or more network entities receive a request related to a packet data network (PDN) connection from a first UE. The request may relate to a second UE. The first UE may comprise a relay eNodeB.

In an aspect of the disclosure, the one or more network entities may establish or modify a connection between a gateway and the first UE in response to the request. Establishing or modifying the connection may include sending an identifier of the second UE to the gateway.

In an aspect of the disclosure, a connection between the gateway and the first UE may be established after receiving a request for a PDN connection which includes an identifier of the first UE and creating a radio bearer for the requested PDN connection. The request for a PDN connection may also include an identifier of the second UE.

In an aspect of the disclosure, the one or more network entities may allocate charges to the second UE for data communicated between the first UE and the gateway on behalf of the second UE. The charges may be allocated to the second UE based on the identifier of the second UE. Allocating charges for data may include providing a credit to the first UE for data communicated on behalf of the second UE. Charges may be allocated for the data using a TFT to discriminate between data corresponding to the first UE and data corresponding to another UE.

In an aspect of the disclosure, a connection between the gateway and the first UE may be modified by creating a radio bearer associated with the second UE.

In an aspect of the disclosure, a relay eNodeB may establish a connection with a terminal UE while connected to a PDN through a collocated UE. A connection with a gateway may be established or modified. Establishing or modifying a connection with the gateway may include sending an identifier of the terminal UE to the gateway. Establishing or modifying a connection with the gateway further includes requesting a radio bearer associated with the terminal UE.

In an aspect of the disclosure, the relay eNodeB may relay data between the terminal UE and the PDN using the established or modified connection with the gateway. The PDN charges are allocated to the terminal UE based on the data relayed between the terminal UE and the PDN.

In an aspect of the disclosure, the relay eNodeB may receive a credit based on data relayed between the terminal UE and the PDN.

The PDN charges allocated to the terminal UE may be allocated using a template to discriminate between data corresponding to the terminal UE and data corresponding to another UE.

In an aspect of the disclosure, a terminal UE may establish a connection with a first eNodeB, which may be a relay. The terminal UE may determine a type of the first eNodeB. The type of the first eNodeB may either be determined to be trusted or untrusted. The terminal UE may establish a VPN connection with a gateway when the first eNodeB relays data to a second eNodeB. PDN data charges may be allocated based on data communicated over the VPN connection. A credit for PDN data may be provided to the eNodeB based on the data communicated through the VPN connection.

DETAILED DESCRIPTION

Figure 1:
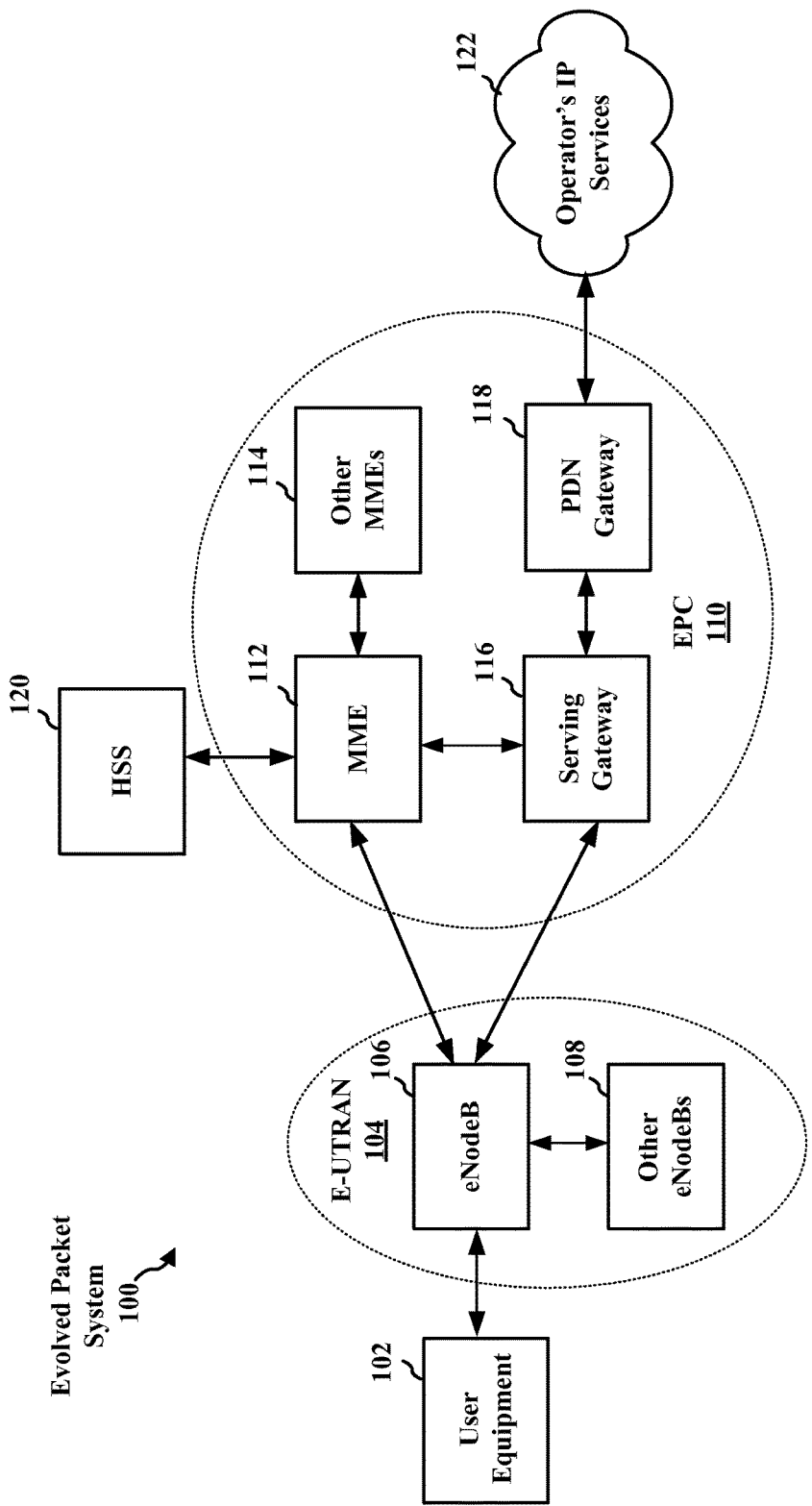
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
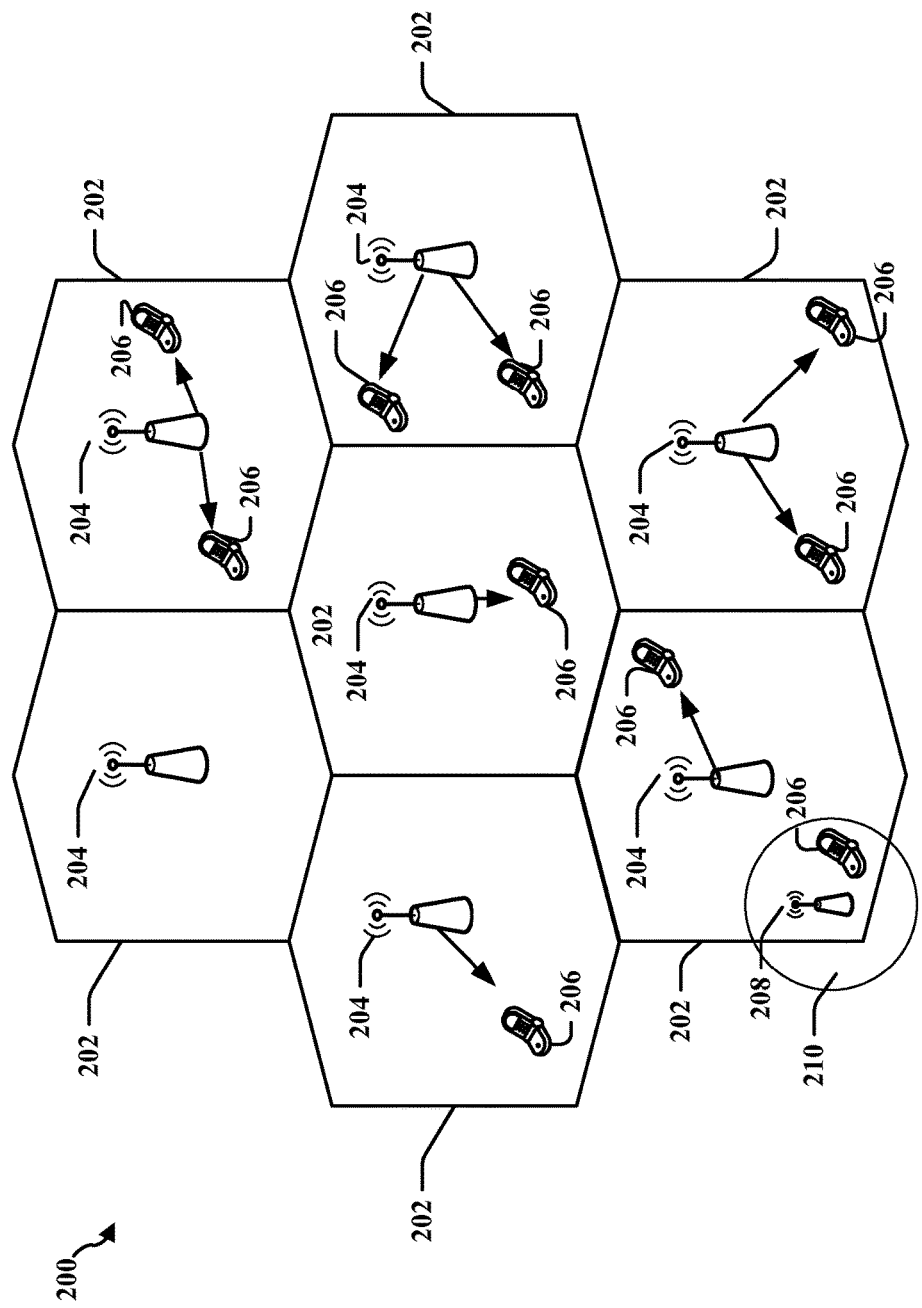
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
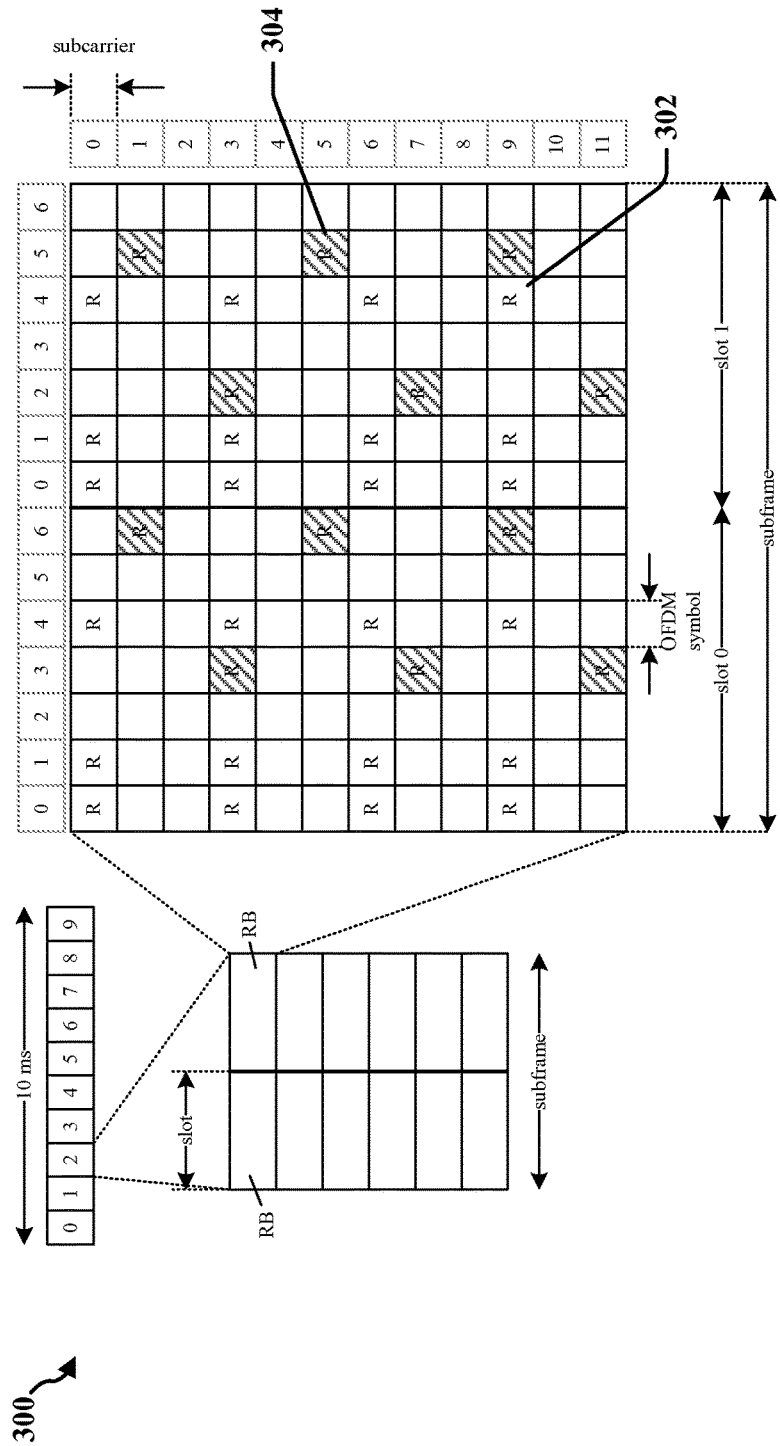
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
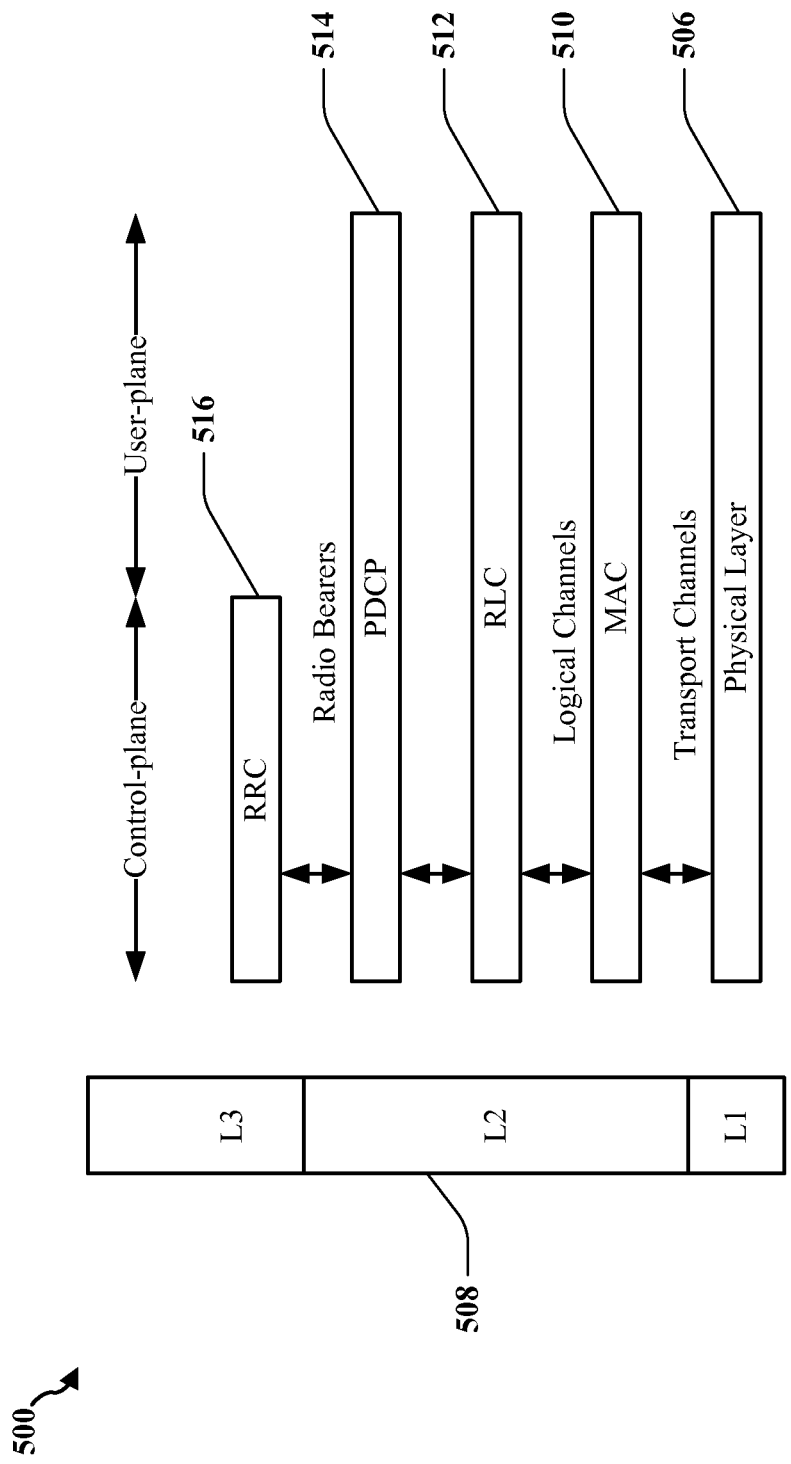
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
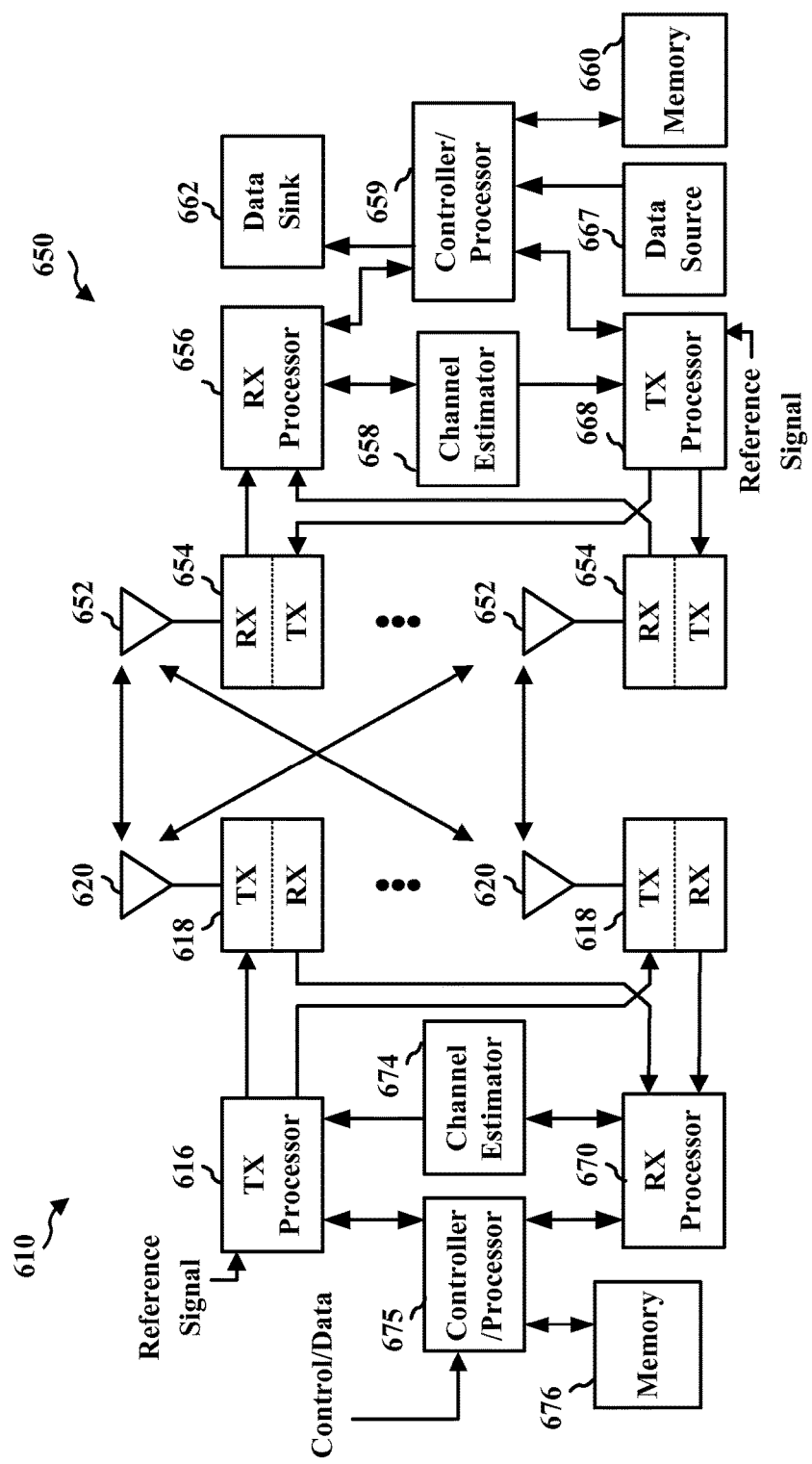
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
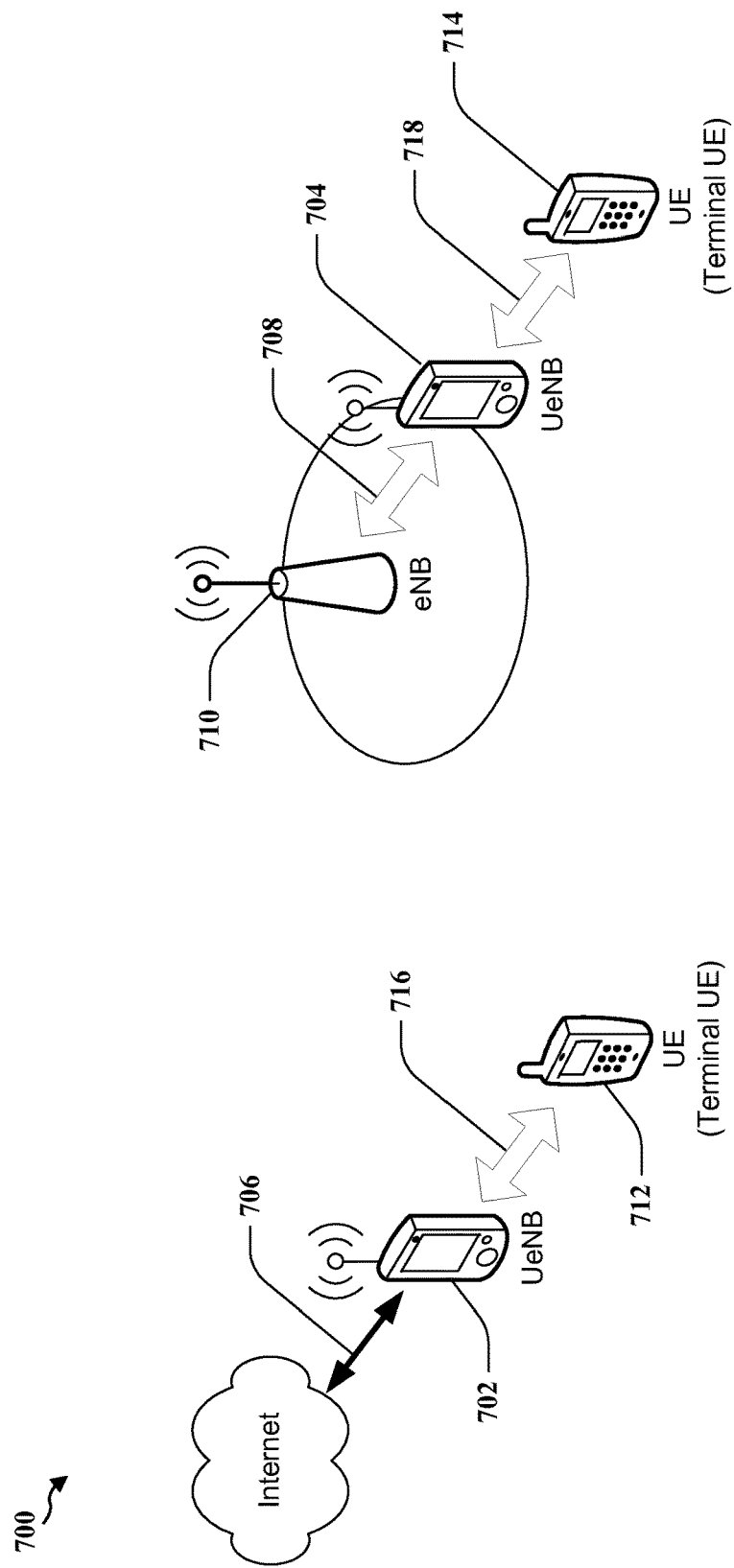
FIG. 7 is a diagram illustrating a network in which UEs are configured to provide relay service.

FIG. 7 is a diagram 700 illustrating a network in which a UE eNodeB (UeNB) 702 or 704 provides network connectivity to a terminal UE (TUE) 712 or 714. UeNB 702 or 704 may advertise its availability to serve as an eNodeB, which provides network connectivity for other TUEs 712 or 714. In one example, UeNB 704 has a wireless backhaul 708, which may include LTE in a licensed spectrum, and UeNB 704 may provide network services to TUE 714 through a wireless access channel 718. In another example, UeNB 702 has a wired backhaul 706 and provides network services to TUE 712 through a wireless access channel 716.

On the access-hop 716 and 718, both UeNBs 702 and 704 behave essentially like a cell, from the PHY-MAC perspective. The UeNBs 702 and 704 may incorporate certain power-saving techniques in addition to those employed by a typical eNB 710 or network-relay (not shown).

In the example of FIG. 7, UeNB 702 provides a backhaul as a wired device, while UeNB 704 provides a wireless backhaul. When functioning as a relay, UeNB 704 may operate as both an eNB and a UE. UeNB 704 communicates with donor eNB 710 on the backhaul 708, behaving essentially like a UE, from a physical/MAC layer (PHY-MAC) perspective. During periods of low traffic activity, the UeNB 704 may go into discontinuous reception (DRX) mode, or idle mode, on the backhaul hop 708 for power-saving or network-load-alleviation purposes.

UeNB 704 may provide backhaul over LTE or another Radio Access Technology (RAT), such as GSM, 1×/DO, etc. UeNB 704 is typically in connected mode on the backhaul link if it is actively connected to any TUEs 714, which are actively transmitting data. UeNB 704 may be in DRX mode on the backhaul link if all the connected TUEs 714 are also in DRX mode. When UeNB 704 is released by the network on the backhaul link, all the connected TUEs 714 are typically released by the UeNB 704.

The UeNB 704 may be in RRC idle or RRC connected mode on the backhaul to advertise access to TUEs 712, 714 when no TUEs 712 or 714 are connected to UeNB 704. In some embodiments, UeNB 704 refrains from using RRC idle mode on the backhaul link in favor of using DRX mode in order to conserve battery power without causing longer overall call setup time for TUE 714.

If UeNB 704 is in RRC idle mode on the backhaul link when a TUE 714 attempts to establish a connection, then the UeNB 704 typically establishes a connection on the backhaul link in order to authorize the TUE 714 for service. UeNB 704 typically refrains from advertising service if it is not camped on a suitable cell on the backhaul link.

In the architectures and diagrams discussed in FIGS. 8, 9, 11A, 11B, and 12, the labels "Uu," "Un," "S1-U," "S1-MME," "S11," "S5/S8," "S6a," "TR-069," and "SGi" indicate interfaces and/or communication protocols that are known in the art and, therefore, will not be discussed in detail herein.

Figure 8:
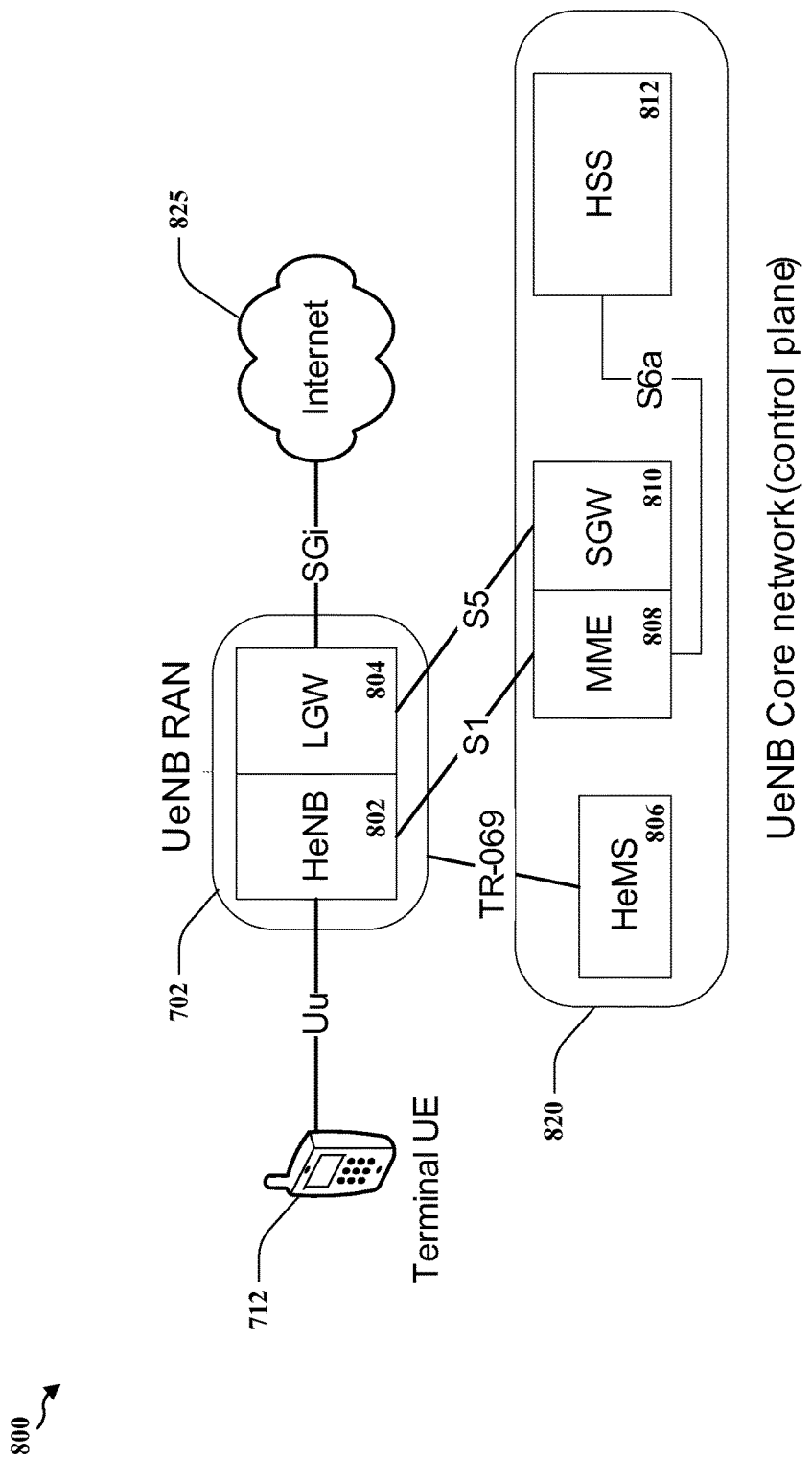
FIG. 8 is a diagram illustrating a UE architected for providing relay service.

FIG. 8 is a diagram 800 illustrating an example of UeNB architecture that may be used with user-deployed UeNB 702. When TUE 712 is camped on a RAN through a connection to a home eNodeB (HeNB) 802, a local IP access (LIPA) PDN gateway 804 provides a data plane and may provide a connection to the PDN 825 to bypass core network (CN) 820 for data services. For example, the PDN 825 may be the Internet. Any suitable network architecture defined for LIPA may be reused for connectivity of TUE 712, but limited mobility services may be available for TUE 712 that is connecting to or from LIPA PDN. The TUE 712 typically attempts to establish the LIPA PDN connection upon each handover to HeNB 802. A PDN connection through the core network 820 may be unavailable for data use based on operator policies or preferences.

A home eNodeB management system (HeMS) 806 may use network operation and maintenance (OAM) data and services and be remotely configured and managed using standardized protocols such as TR-069 that may be adapted for use with HeNB 802. The control plane may remain centralized using the MME 808, serving gateway (SGW)

810, and a home subscriber server (HSS) 812, which maintains subscription-related information that supports the call handling.

Figure 9:
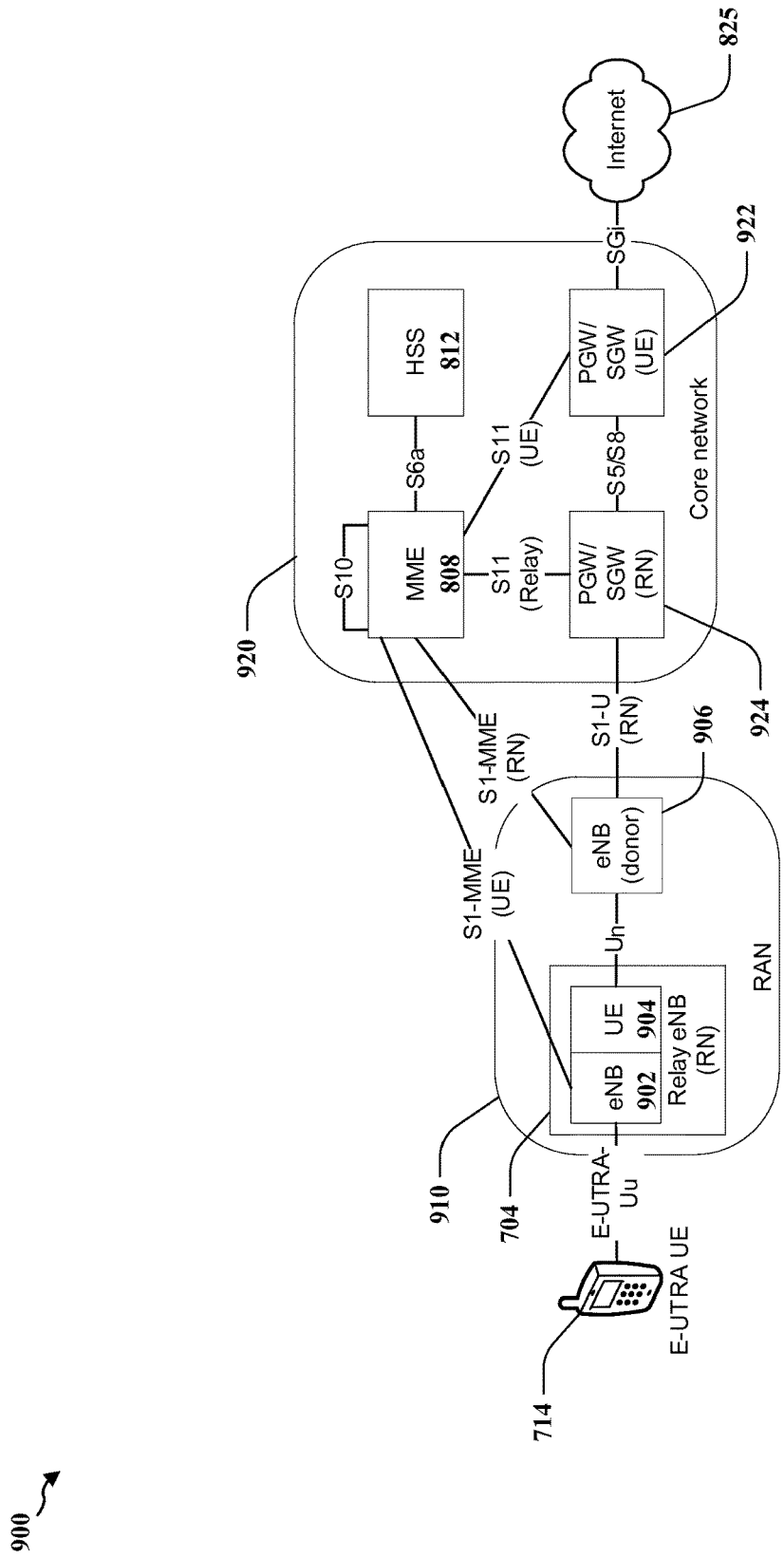
FIG. 9 is a diagram illustrating a UE architected for providing relay service.

FIG. 9 is a diagram 900 illustrating an example of an architecture used with UeNB 704. In this example, TUE 714 is served by one or more gateways 924, 922 in the core network 920, such as PDN gateway 922. UeNB 704 need not have a local PDN gateway. An e-UTRAN 910 comprising UeNB 704 and eNB 906. UeNB 704 comprises an eNB 902 and a UE 904. UeNB 704 may act as a relay for eNB 906.

Certain embodiments provide systems and methods for accounting and charging related to network usage involving UeNBs 702 and 704. An operator of a network may wish to assign usage charges to the TUE 712 or 714 that is responsible for the network traffic through UeNB 702 or 704. UeNB 702 and 704 can relay data on behalf of TUE 712 or 714 and can also generate network traffic. Accordingly, assignment of usage charges typically requires identification of the UE responsible for the traffic. A network operator may assign charges for data usage by UeNB 702 or 704 to TUE 712 or 714 and provide an equivalent credit to UeNB 702 or 704. The network operator may select a mode identifying the UE responsible for network traffic based on the trustworthiness of UeNB 702 or 704. UeNB 704 may be untrustworthy if, for example, it is configured to bundle its own transmissions with transmissions from one or more TUE 712 or 714, such that usage cannot be properly assigned, resulting in charges and credits being inappropriately applied.

Charging for TUE 714 access of a UeNB 704 may be implemented by a network entity of the operator network when the UeNB 704 is connected by an LTE or UMTS backhaul. In some embodiments, an element of the UeNB 704 may account for network usage charges on the UeNB 704 access network. For example, a local gateway 804 (see FIG. 8) collocated with UeNB 702 or 704 may handle accounting functions such as using hot-lining, which may involve monitoring traffic by redirecting traffic to a redirect server.

Charging for network usage related to UeNB 702 or 704 may be controlled and managed by an entity of the operator network 920 and/or by the UeNB 702 or 704. In one example, UeNB 702 or 704 may be configured to implement certain predefined procedures that determine when to trigger charging in the network after a TUE 712 or 714 establishes a connection.

For UeNB 702 or 704 initiated procedures, charging and accounting functionality is typically provided by serving gateway/PDN gateway (PGW/SGW) 922 of operator network 920. The PGW/SGW 922 may collect and report accounting information for each connected TUE 712, 714. Accounting information may identify the amount of data transmitted in uplink and downlink directions, and may be categorized using a quality of service (QoS) class identifier (QCI) and allocation and retention priority (ARP) pair per UE per PDN connection. QCI may include a parameter of the QoS profile of an EPS bearer and is typically a scalar which refers to access node-specific parameters that control bearer-level packet forwarding treatment such as scheduling weights, admission thresholds, queue management thresholds, link layer protocol configuration. ARP may be a parameter of the QoS profile of the EPS bearer related to bearer establishment/modification decisions. The accounting information may be collected and reported on a per-bearer basis.

The PGW may provide charging functionality for each TUE 712, 714 according to standards-defined procedures. In some embodiments, procedures define methods for charging associated with a PDN connection using an international mobile subscriber identity (IMSI) of a TUE 712 or 714 that is connected to the UeNB 702 or 704. In some embodiments, charging is performed at the operator network upon creation of a new PDN connection. One method for charging at the operator network includes establishing a new PDN connection for each TUE 712 or 714 connected to the UeNB 702 or 704 using UE-requested PDN connectivity procedures.

With reference again to FIG. 8, an operator network may identify the TUE 712 associated with the PDN connection using an IMSI included by the UeNB 702 in the PDN connection request message, when a gateway 804 is collocated with the UeNB 702. In one example, an information element (IE) may be defined to identify the IMSI. In another example, the IMSI may be included as part of a request for access point name (APN). Traffic associated with the PDN connection can then be charged to the IMSI.

With reference again to FIG. 9, UeNB 704 may use a separate PDN connection to the core network 920 to indicate that this traffic is exclusively relay traffic for TUE 714, when a PGW/SGW 922 located in core network 920 is used. In this case. PGW/SGW 924 for the relay (shown as PGW/SGW (relay) 924 in FIG. 9) may be configured to permit only GPRS tunneling protocol (GTP) traffic directed to an appropriate serving gateway target to pass through the packet data network. All other traffic may be dropped to ensure that the UeNB 714 does not insert traffic on the packet data network connection to get free service for UE 904 for another UE at the expense of the charged TUE 714.

In certain embodiments, the operator network implements accounting and charging using a procedure based on modify bearer requests. Modify bearer requests are typically used when a local gateway 804 is collocated with an HeNB 802 in UeNB 702 (see FIG. 8). Usage charges may be identified and allocated to TUE 712 when a new PDN connection is requested for each connected TUE 712. Each PDN connection requires a radio bearer to be allocated to the UeNB 702, and the number of radio bearers available to the UeNB 702 on the backhaul may be subject to a predefined limit. For example, a UeNB 702 may be limited to approximately 8 radio bearers.

When the UeNB 702 has limited availability of radio bearers, TUE 712 may be identified for the purposes of accounting and charging through a traffic flow template (TFT). TFTs may discriminate between different user payloads using Internet Protocol (IP) header information such as source and destination IP addresses and transmission control protocol (TCP) port numbers. In normal use, TFTs may be used to filter packets for voice over IP (VoIP) from lower priority traffic such as web browsing traffic in order to assign an appropriate QoS. In some embodiments, UeNB 702 may use network address translation (NAT) for connecting TUE 712 to an IPv4 network. The UeNB 702 can assign a specific range of ports to each connected TUE 712.

Figure 10:
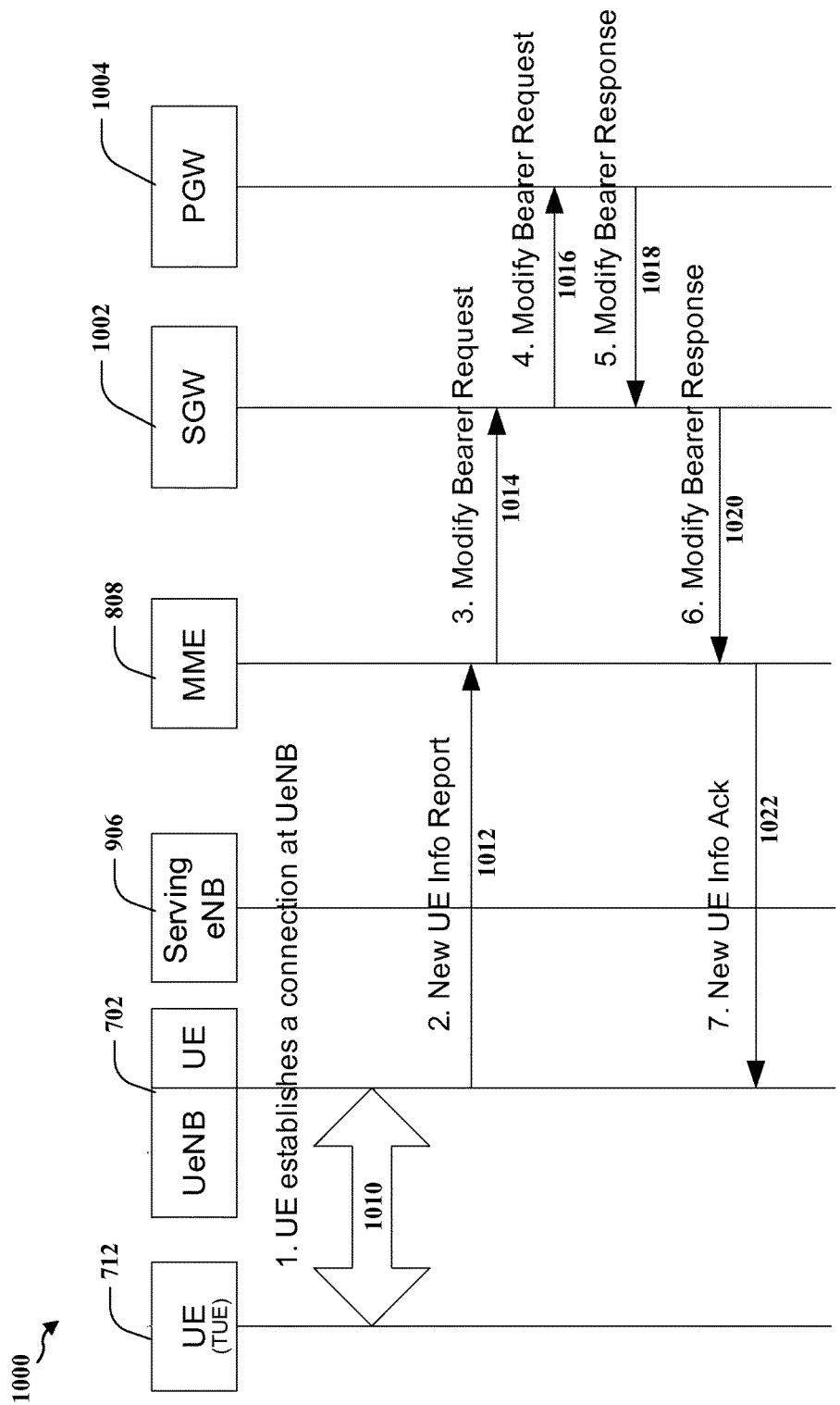
FIG. 10 is a simplified call flow diagram related to a method of wireless communication.

FIG. 10 illustrates an example call flow 1000 in which UeNB 702 uses the modify bearer request procedure to enable charging for a connected TUE 712 at the operator network 920. In FIG. 10, TUE 712 establishes, at 1010, a connection at the UeNB 702. UeNB 702 may send, at 1012, a newly defined S1 message comprising a new TUE 712 information report to the MME 808 identifying TUE 712 as having established a connection. TUE 712 may be identified by its IMSI and any service flows associated with TUE 712 may be identified by the IMSI. The service flows associated with the TUE 712 may be unique to the TUE 712 under the UeNB 702. In some embodiments, new IEs may be added to an existing NAS message to describe the IMSI and associated service flows via TFTs to the MME 808.

Charging for UeNB 702 access at the operator network 920 may be enabled by a request by PDN gateway 1004 for user information corresponding to UeNB 702. In response to such request, then at 1014 the MME 808 may send a modify bearer request message to the serving gateway 1002 that includes UeNB 702 user information IE. UeNB 702 user information includes the IMSI of the TUE 712 as well as the TFT of any service flows associated with the TUE 712. The serving gateway 1002 may send a modify bearer request at 1016 to one or more PDN gateways 1004, including UeNB 702 information IE received from MME 808. A modify bearer response message 1018 may be returned to the serving gateway 1002 by the PDN gateway 1004.

At 1020, the serving gateway 1002 sends the modify bearer response message to MME 808. At 1022, the MME 808 sends a new TUE 712 information ACK S1 message to the UeNB 702. A similar procedure may be performed when the TUE 712 is either released or performs a handover away from the UeNB 702 to stop the charging.

Figure 11A:
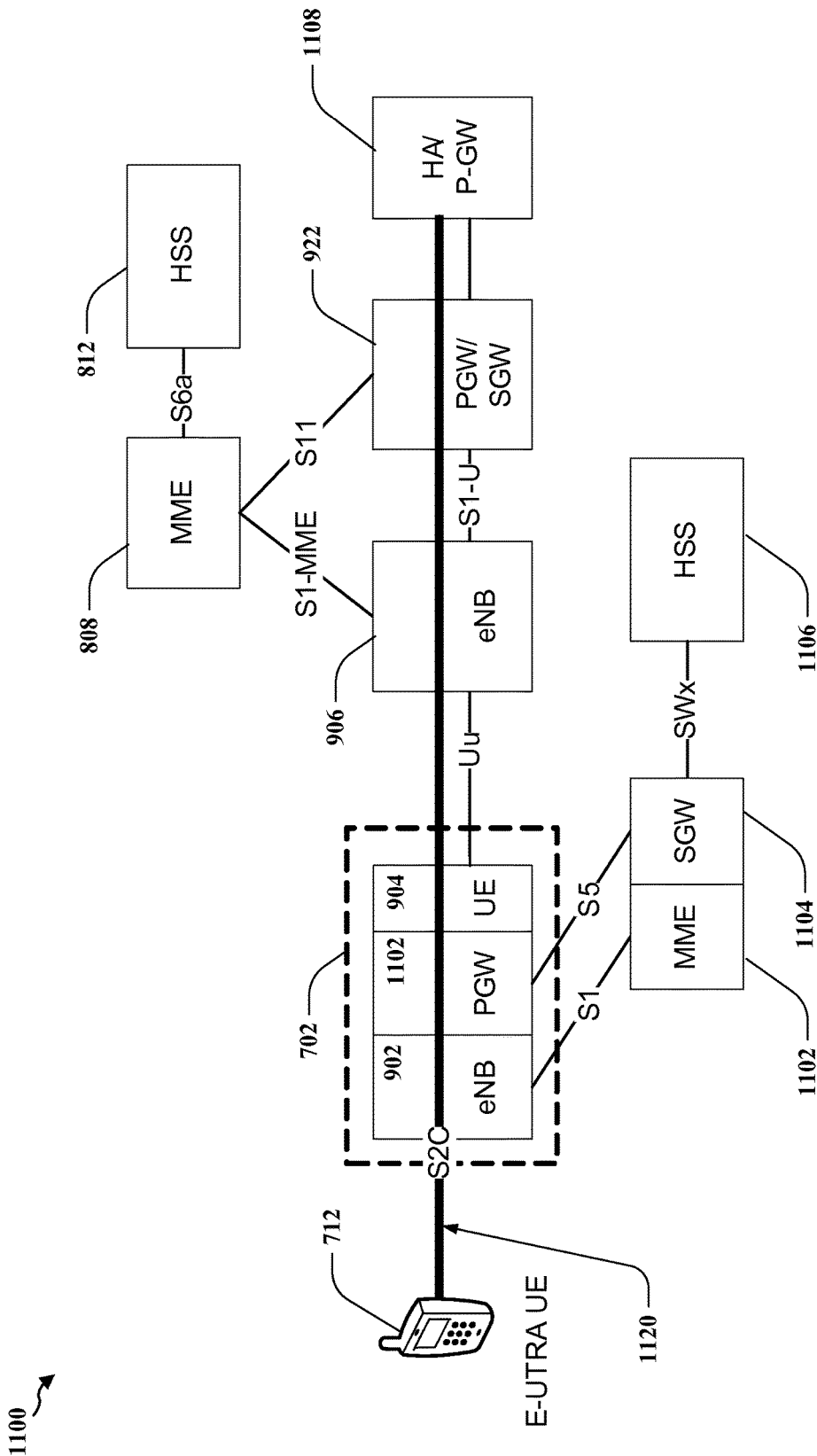
FIGS. 11A and 11B are diagrams illustrating charging over a user-deployed relay.

FIG. 11A is a diagram 1100 illustrating a method of charging at the operator network using a home agent (HA)/packet gateway (P-GW) 1108, which is typically used when a packet gateway 1102 is collocated with UeNB 702. Diagram 11A includes MME 1102, SGW 1104, and HSS 1106 are UeNB EPC network elements, where MME 1102, SGW 1104, and HSS 1106 are in communication with UeNB 702. In some embodiments, the TUE 712 establishes a VPN tunnel 1120 during PDN gateway 922 connection establishment. In the configuration of FIG. 11A, the VPN tunnel 1120 may be established using an S2C interface. TUE 712 may employ a procedure that is similar to procedures used for PDN connection Wi-Fi and 3GPP access networks.

In one example, TUE 712 may use an IP security (IPsec) tunnel for data connections while communicating through UeNB 702. In this example, UeNB 702 may use a special access point name (APN) for all TUE 712 traffic. In some embodiments, TUE 712 may be required to establish an IPSec tunnel with HA/P-GW 1108 in order to receive data service and PDN gateway 922 may block all traffic that is not sent to the HA/P-GW 1108.

Use of HA/P-GW 1108 for charging may employ existing procedures in the operator network for managing interactions with MME 808 and PGW/SGW 922, and charging and accounting may be enforced by causing traffic to be routed through the HA/P-GW 1108. In some embodiments, additional measures may be implemented to provide limited access to local service.

Figure 11B:
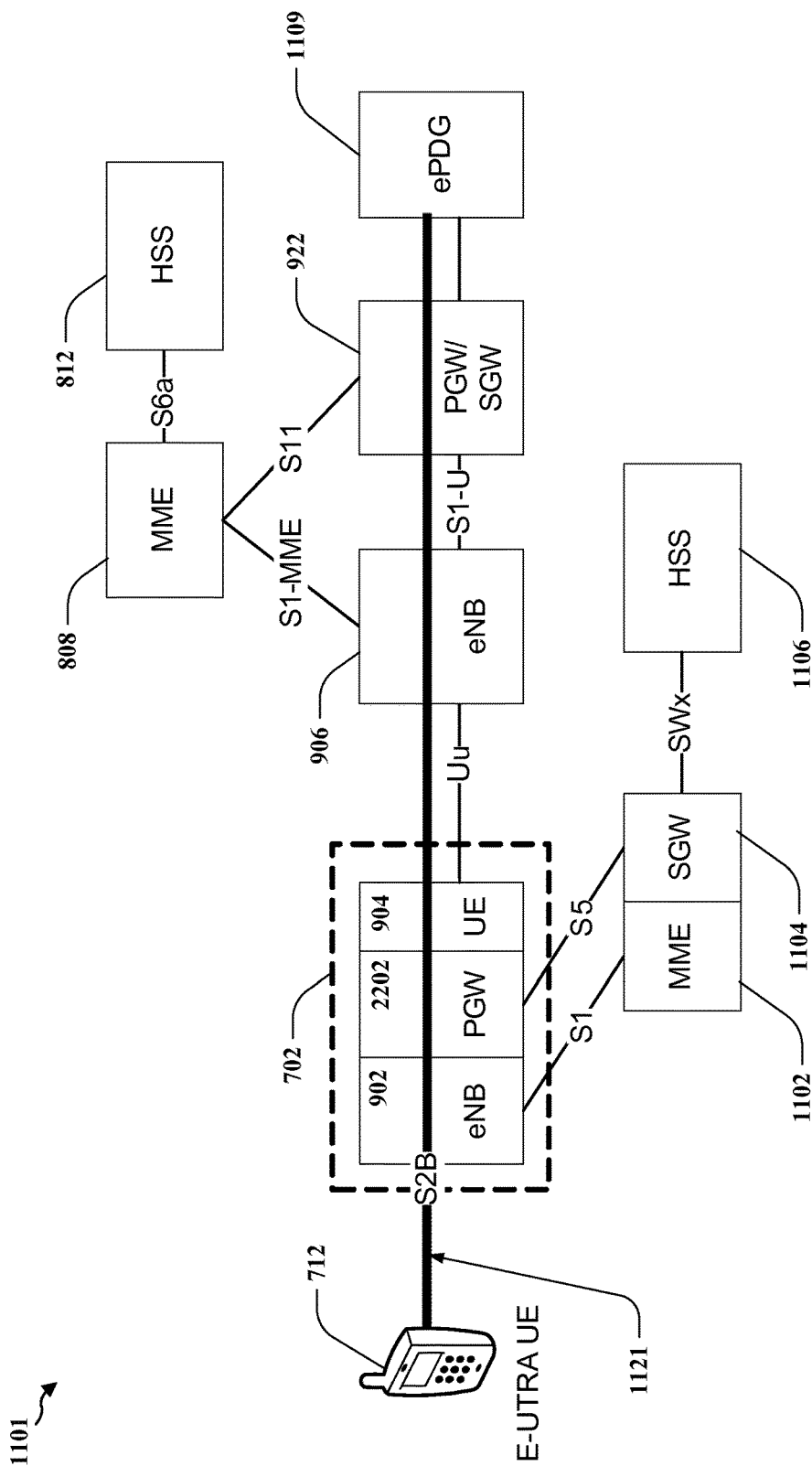

FIG. 11B is a diagram 1101 illustrating a method of charging at the operator network using an evolved packet data gateway (ePDG) 1109 when using an untrusted access to the operator network. The TUE 712 establishes a VPN tunnel 1121 during PDN gateway 922 connection establishment. In the configuration of FIG. 11B, the VPN tunnel 1121 may be established using an S2B interface.

In one example, TUE 712 may use an IPsec tunnel for data connections while communicating through UeNB 702. In this example, UeNB 702 may use a special APN for all TUE 712 traffic. Untrusted access is routed to the ePDG 1109, which provides security mechanisms for connections with TUEs over an untrusted access.

Figure 12:
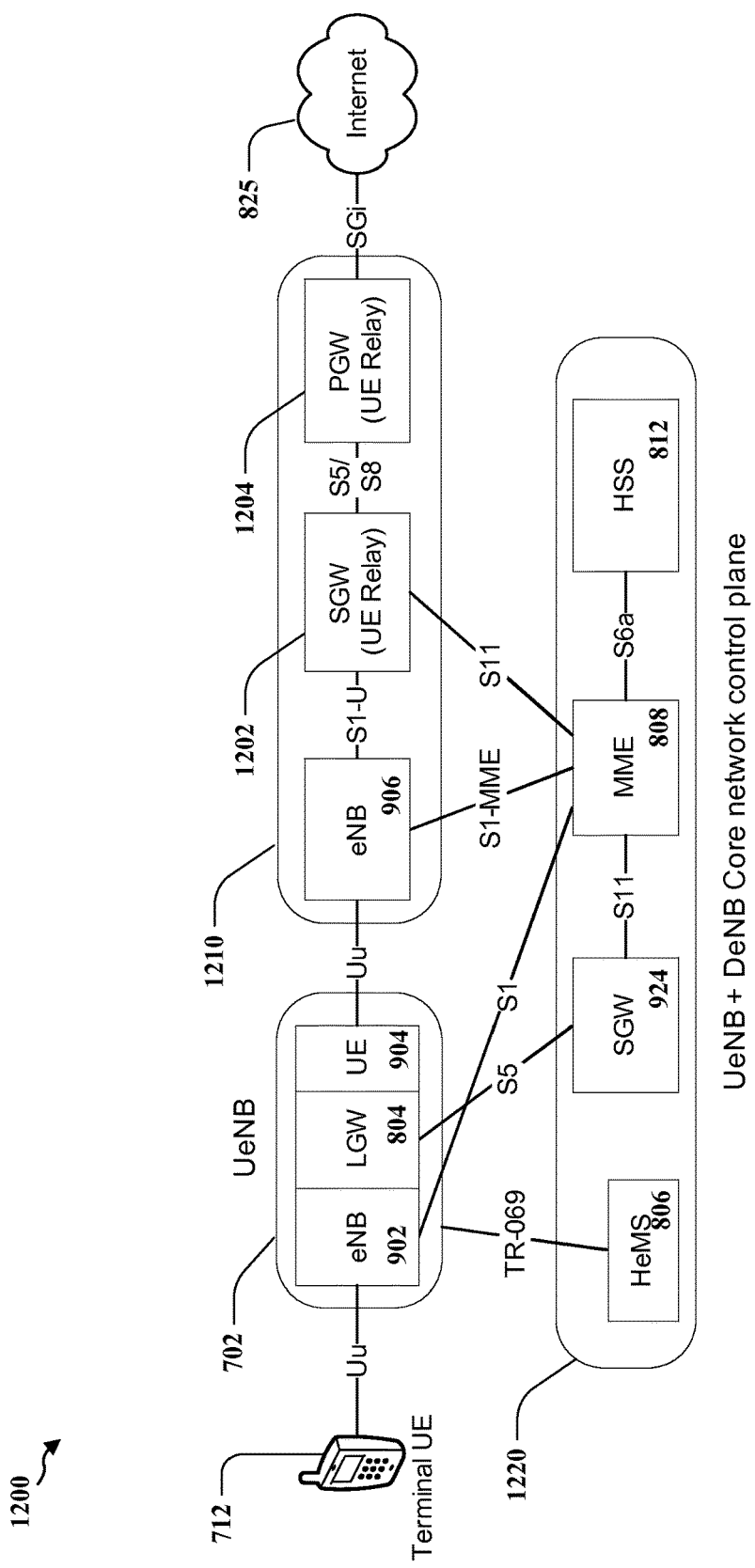
FIG. 12 is a diagram illustrating charging over a user-deployed relay.

FIG. 12 illustrates an architecture 1200 that may be used with an LTE backhaul. Architecture 1200 includes UeNB 702, LTE backhaul 1210, and a UeNB and DeNB Core network control plane 1220. The LTE backhaul 1210 includes eNB 906, SGW (UE relay) 1202, and PGW (UE Relay) 1204. The UeNB and DeNB Core network control plane 1220 includes HeMS 806, SGW 924, MME 808, and HSS 812. UeNB 702 may be deployed for any type of access connection and any type of backhaul connection and is usable with any of a plurality of networks, including legacy cellular networks, wired networks, Wi-Fi networks, etc.

Certain embodiments implement procedures for IP address allocation for the TUE 712. These procedures may include standards-defined procedures and/or procedures adapted according to certain aspects of the invention. In one example, TUE 712 may be assigned an IP address by the UeNB 702 during the default bearer activation. In an IPv4 network, the TUE 712 may use IPv4 address allocation via default bearer activation. In an IPv6 network, the TUE 712 may uses /64 IPv6 prefix allocation via IPv6 Stateless Address autoconfiguration.

In another example, TUE 712 may indicate to the network within the Protocol Configuration Options element that the TUE 712 wants to obtain the IP address through DHCP. In an IPv4 network, the TUE 712 uses IPv4 address allocation and IPv4 parameter configuration after the attach procedure via DHCPv4. In an IPv6 network, the TUE 712 uses IPv6 parameter configuration via Stateless DHCPv6. The TUE 712 may additionally request the allocation of IPv6 prefixes using DHCPv6.

Certain embodiments implement procedures for IP address allocation for the UeNB 702. These procedures may include standards, defined procedures, and/or procures adapted according to certain aspects of the invention. For example, the procedures may include methods currently used for IP address allocation for WLAN IP address allocation or for a PGW in the WWAN.

In some embodiments, UeNB 702 may assign an IP address to the TUE 712 in an IPv4 network and/or an IPv6 network. In an IPv4 network the UeNB 702 allocates an unused private IPv4 address for use by the TUE 712 and may start a NAT engine for the purpose of Network Address and Port Translation. UeNB 702 may then assign the allocated IP address to the TUE 712 via NAS signaling for default bearer activation or DHCP.

Figure 13:
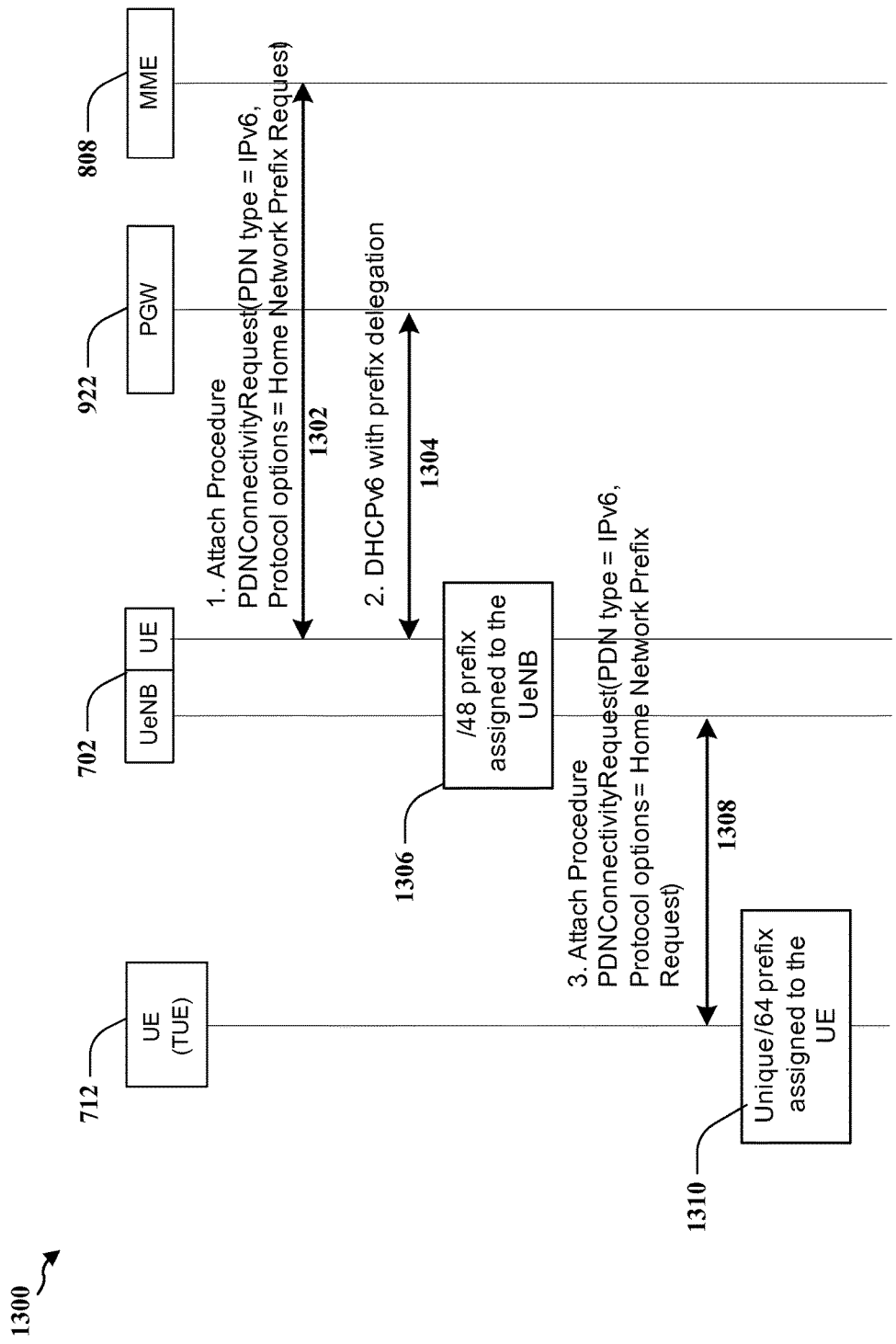
FIG. 13 is a simplified call flow diagram related to a method of wireless communication.

FIG. 13 illustrates a call flow 1300 for allocating an IPv6 address to the TUE 712 by UeNB 702 after an attach procedure 1302. In some embodiments, the UeNB 702 determines that DHCPv6 should be used to obtain an IPv6 address. At 1304, the UeNB 702 may use prefix delegation options in DHCPv6 to obtain a /48 IPv6 address prefix for EPS Backhaul. At 1306, UeNB 702 may allocate a unique /64 IPv6 prefix from within the /48 IPv6 prefix for use by the TUE 712. UeNB 702 may then assign, at 1310, the allocated IP address to the TUE 712 via NAS signaling for default bearer activation or DHCPv6, completing the attach procedure at 1308.

Figure 14:
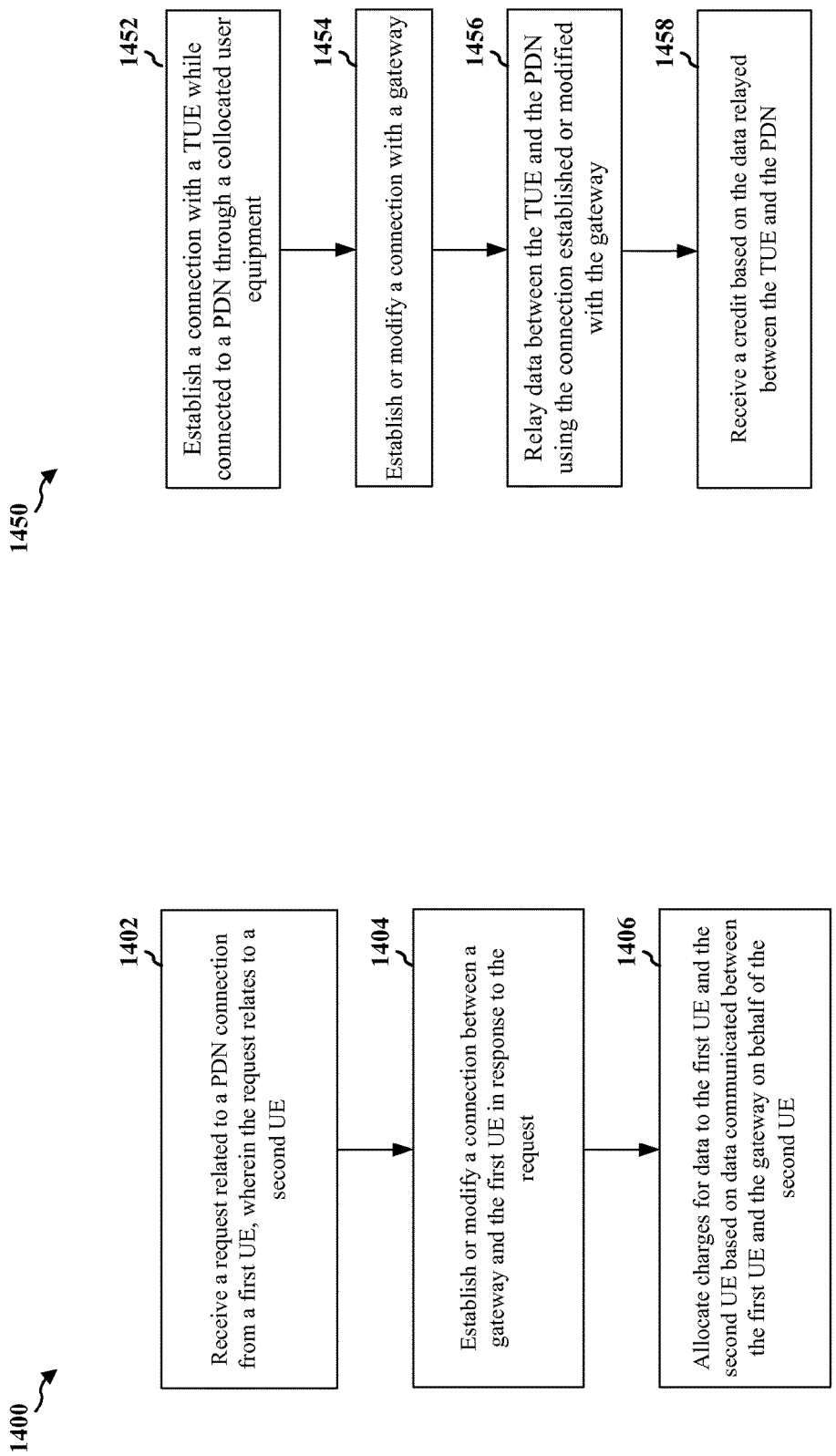
FIG. 14 includes flow charts related to a method of wireless communication.

FIG. 14 includes a flow chart 1400 of a method of wireless communication. The method may be performed, at least in part, by one or more network entities that may include an MME 808.

At step 1402, the one or more network entities receive a request related to a PDN connection from a first UE 702. The first UE 702 may be a relay eNodeB. The request may relate to a second TUE 712 or 714.

At step 1404, the one or more network entities establish or modify a connection between a gateway 810 and the first UE 702 in response to the request. Establishing or modifying the connection may include sending an identifier of the second UE to the gateway. The gateway 922 or 924 may be provided in a core network entity 920. The gateway may include one or more of a PDN gateway 922, a serving gateway 924, a serving general packet radio service (GPRS) support node and a gateway GPRS support node. A connection between the gateway 922 or 924 and the second UE 712 or 714 may be established after receiving a request for a PDN connection which includes an identifier of the second UE 712 or 714. A connection between the gateway 922 or 924 and the second UE 712 or 714 may include creating a radio bearer for the requested PDN connection. Charges for the data may be allocated to the second UE 712 or 714 for data communicated over the created radio bearer. Charges for the data may be allocated to the second UE 712 or 714 for data communicated with the identifier of the second UE 712 or 714. The identifier of the second UE 712 or 714 may comprise an IMSI of the second UE 712 or 714.

At step 1406, the one or more network entities allocate charges for data to the first UE 702 and the second UE 712 or 714 based on data communicated between the first UE 702 and the gateway 922 or 924 on behalf of the second UE 712 or 714. The one or more network entities may allocate charges for data by allocating charges to the second UE 712 or 714 for data communicated between the second UE 712 or 714 and the PDN 825 through the relay eNodeB 702 and the gateway 922 or 924. The one or more network entities may allocate charges for data includes providing a credit to the first UE 702 for data communicated between the second UE 712 or 714 and the network through the relay eNodeB 702 and the gateway 922 or 924. Charges may be allocated for the data using a TFT to discriminate between data corresponding to the second UE 712 or 714 and data corresponding to another UE. The TFT may identify one or more TCP ports allocated to the second UE 712 or 714 by the relay eNodeB 702.

In some embodiments, modifying a connection between the gateway 922 or 924 and the second UE 712 or 714 includes creating a radio bearer associated with the second UE 712 or 714. Charges for the data may be allocated to the second UE 712 or 714 for data communicated using the radio bearer associated with the second UE 712 or 714. Charges for the data may be allocated based on the data communicated by the first UE 702 behalf of the second UE 712 or 714 at a PDN gateway 924. Charges may be allocated for the data by accounting for data communicated through a VPN connection on behalf of the second UE 712 or 714. A VPN home agent may identify the data communicated through the VPN connection on behalf of the second UE 712 or 714. Charges for network usage may be allocated by providing a credit to the first UE 702 for data communicated through the VPN connection on behalf of the second UE 712 or 714.

FIG. 14 further includes a flow chart 1450 of a method of wireless communication. The method may be performed by a UeNB 702.

At step 1452, the UeNB 702 establishes a connection with a TUE 712 or 714 while connected to a PDN 825 through a collocated UE.

At step 1454, the UeNB 702 establishes or modifies a connection with a gateway. The gateway may include one or more of a PDN gateway 922, a serving gateway 924, a serving GPRS support node and a gateway GPRS support node. Establishing or modifying a connection with the gateway 922 may include requesting a radio bearer associated with the TUE 712 or 714.

At step 1456, the UeNB 702 relays data between the TUE 712 or 714 and the PDN using the established or modified connection with the gateway. The PDN charges are allocated to the TUE 712 or 714 based on the data relayed between the TUE 712 or 714 and the PDN. The PDN charges may be allocated to the TUE 712 or 714 are allocated based on data communicated over the requested radio bearer. The PDN charges allocated to the TUE 712 or 714 may be allocated using a TFT to discriminate between data corresponding to the TUE 712 or 714 and data corresponding to another UE. One or more TCP ports may be identified in the TFT, and the PDN charges allocated to the TUE 712 or 714 may be allocated based on a TCP port used to relay the data between the TUE 712 or 714 and the PDN.

At step 1458, the UeNB 702 a credit is received that is based on the data relayed between the TUE 712 or 714 and the PDN.

Figure 15:
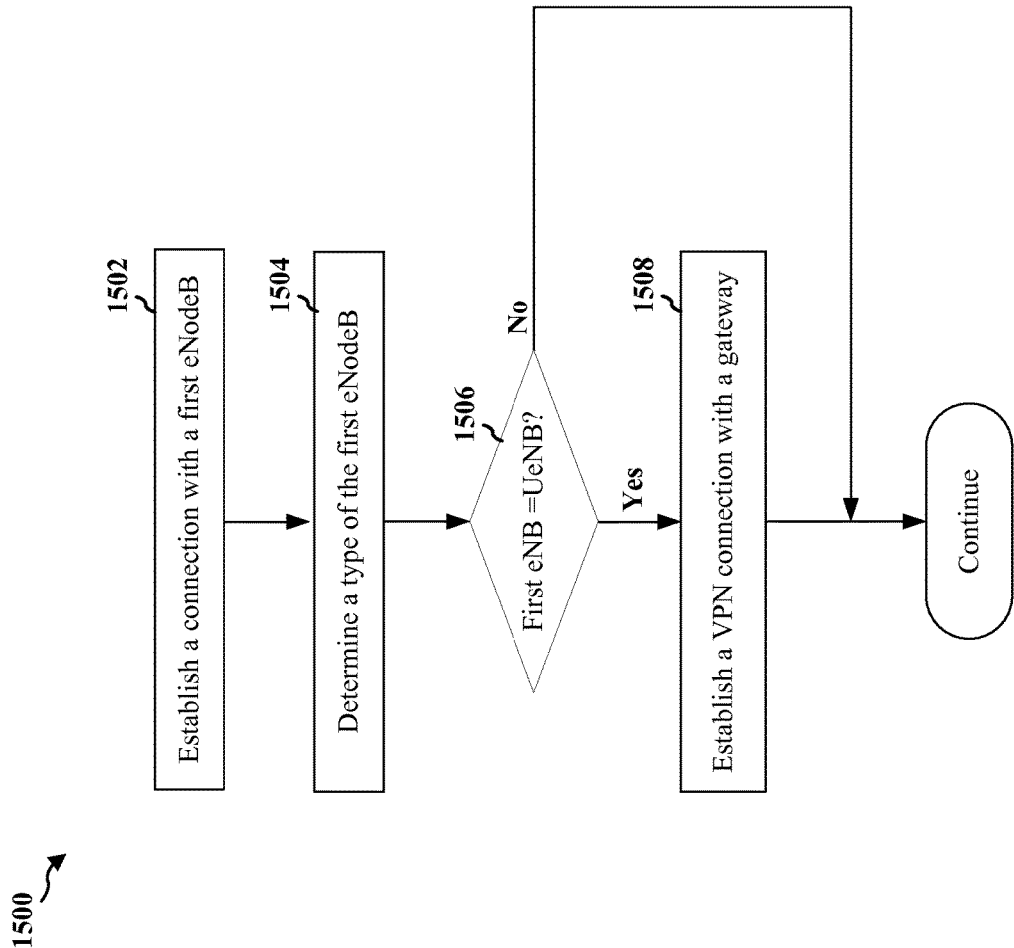
FIG. 15 is a flow chart of a method of wireless communication.

FIG. 15 includes a flow chart 1500 of a method of wireless communication. The method may be performed by a TUE 714. At step 1502, the TUE 714 establishes a connection with a first eNB 704. In some embodiments, the first eNB 704 comprises a relay. The first eNB 704 may be a UeNB that includes a UE and an eNB.

At step 1504, the TUE 714 determines a type of the first eNB 704. For example, the type of the first eNB 704 may be a relay eNB. As another example, the type of the first eNB 704 may be either trusted or untrusted. In such a case, trusted may indicate that a VPN connection is not required and untrusted may indicate that a VPN connection is required. In an aspect, the type of the first eNB 704 may be advertised by the first eNB 704 or may be based on an identifier, such as a public land mobile network (PLMN) ID or a tracking area code (TAC).

At step 1506, the TUE 714 determines whether the type of the first eNB 704 is a relay eNB (also referred to as a "UeNB"). If the first eNB 704 is a UeNB (1506), then at step 1508, the TUE 714 establishes a VPN connection with a gateway when the first eNB 704 relays data to a second eNB 710. In an aspect, the gateway may be a Home agent and the VPN connection may be a DSMIPv6 IPSec connection. In another aspect, the gateway may be an evolved packet data gateway (ePDG) and the VPN may be an IPSec tunnel. PDN data charges may be allocated based on data communicated over the VPN connection. A credit for PDN data may be provided to the UeNB 704 based on the data communicated through the VPN connection. If the first eNB 704 is not a UeNB (1506), the VPN connection with the gateway is not established.

Figure 16:
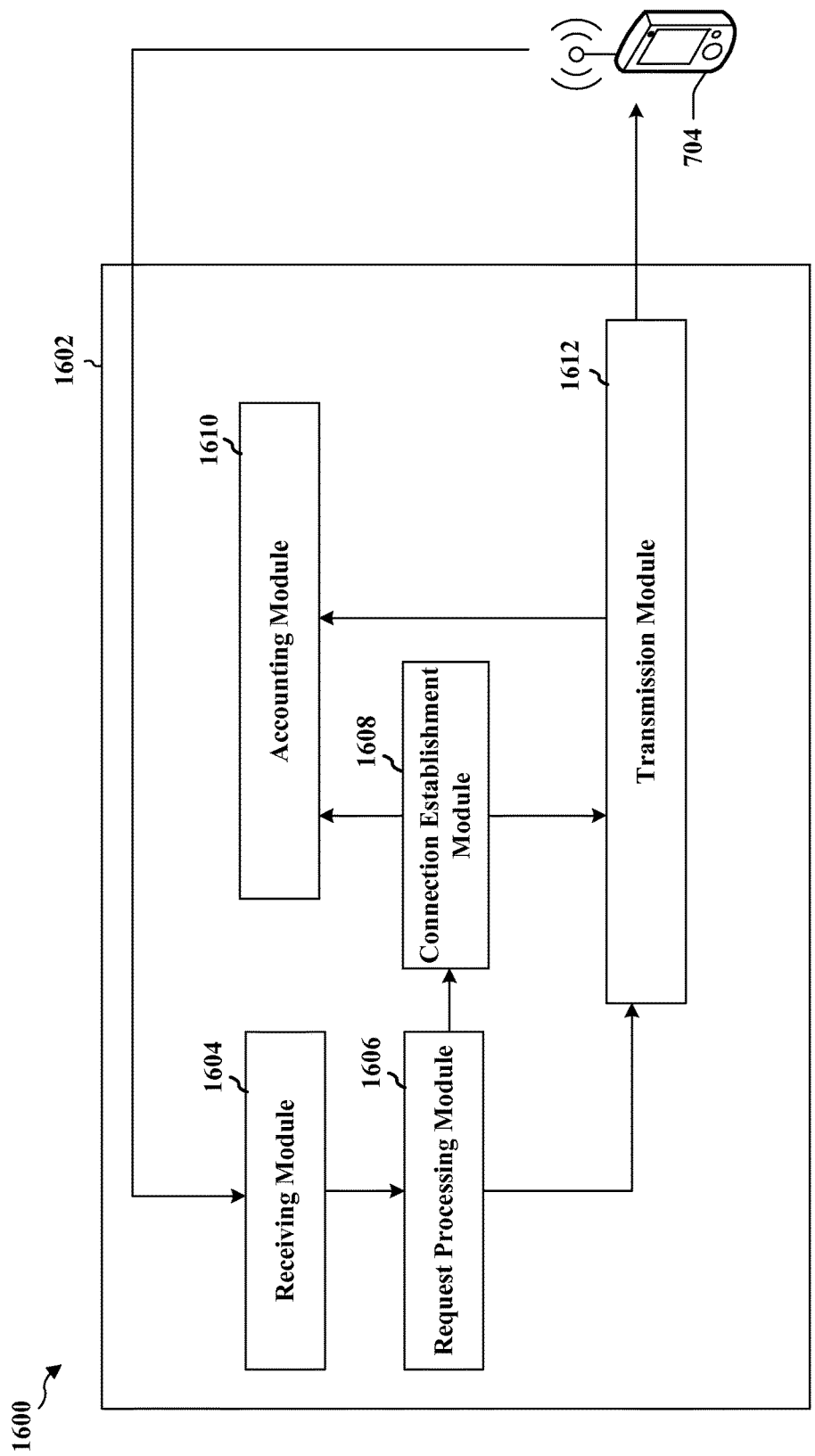
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602. The apparatus may be an eNB 710. The apparatus includes a module 1604 that receives requests from one or more of a TUE 712 or 714. In one configuration, the request may be generated by the TUE 712 or 714 and relayed to the eNB 710 by one of UeNB 702 or 704. The apparatus 1602 further includes a module 1606 that processes the requests, a module 1608 that establishes connections with one or more of a network entity, a UeNB 702 or 704 and a TUE 712 or 714, an accounting module 1610 that allocates charges for data and a transmission module that communicates with the with one or more of a network entity, a UeNB 702 or 704 and a TUE 712 or 714.

The apparatus may include additional modules that perform each of the steps of the algorithm in the aforementioned flow chart of FIG. 14. As such, each step in the aforementioned flow chart of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
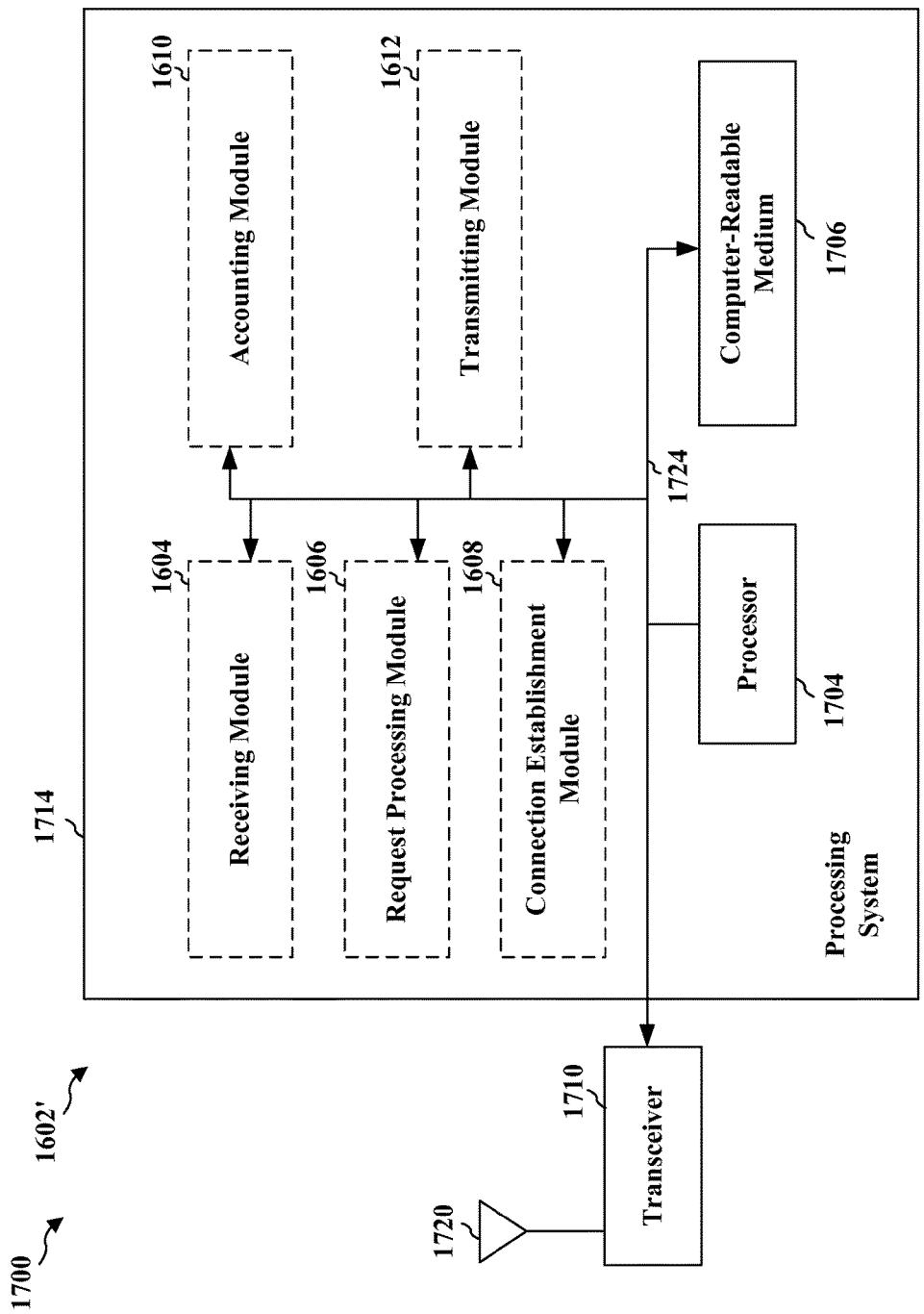
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, 1610, 1612, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1604, 1606, 1608, 1610, and 1612. The modules may be software modules running in the processor 1704, resident/stored in the computer readable medium 1706, one or more hardware modules coupled to the processor 1704, or some combination thereof. The processing system 1714 may be a component of the eNB 610 and may include the memory 676 and/or at least one of the TX processor 616, the RX processor 670, and the controller/processor 675.

In one configuration, the apparatus 1602/1602' for wireless communication includes means 1604 for receiving a request related to a PDN connection from a first UE, means 1606 for processing the request, means 1608 for establishing or modifying a connection between a gateway and the first UE in response to the request, means 1612 for communicating data between the first UE and the gateway on behalf of the second UE, and accounting means 1610 for allocating charges for data communicated between the first UE and the second UE.

The aforementioned means may be one or more of the aforementioned modules of the apparatus 1602 and/or the processing system 1714 of the apparatus 1602' configured to perform the functions recited by the aforementioned means. As described supra, the processing system 1714 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 18:
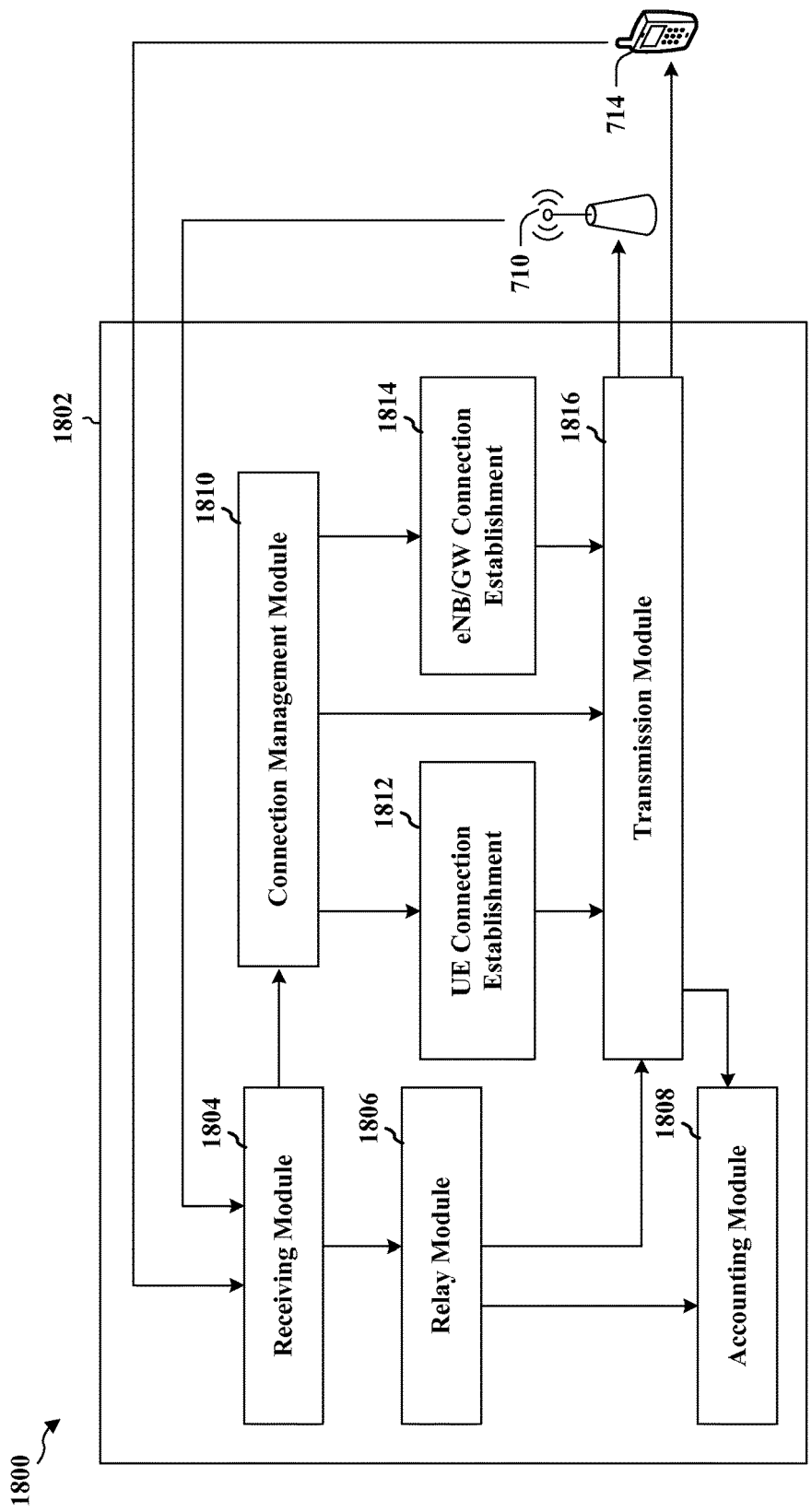
FIG. 18 is a conceptual data flow diagram illustrating the data flow between different modules/means/components in an exemplary apparatus.

FIG. 18 is a conceptual data flow diagram 1800 illustrating the data flow between different modules/means/components in an exemplary apparatus 1802. The apparatus may be UeNB 704. The apparatus includes a module 1804 that receives information from a TUE 714 and a gateway via the eNB 710, a module 1806 that relays data between the TUE 714 and the gateway, a module 1810 that determines and manages connections, a module 1812 that establishes connections with the TUE 714, a module 1814 that establishes connections with the gateway, a module 1816 that transmits data to the TUE 714 and the gateway, and module 1808 that allocates data charges based on data transmitted between the TUE 714 and the eNB 710.

The apparatus may include additional modules that perform each of the steps of the algorithm in the aforementioned flow chart of FIG. 14. As such, each step in the aforementioned flow chart of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 19:
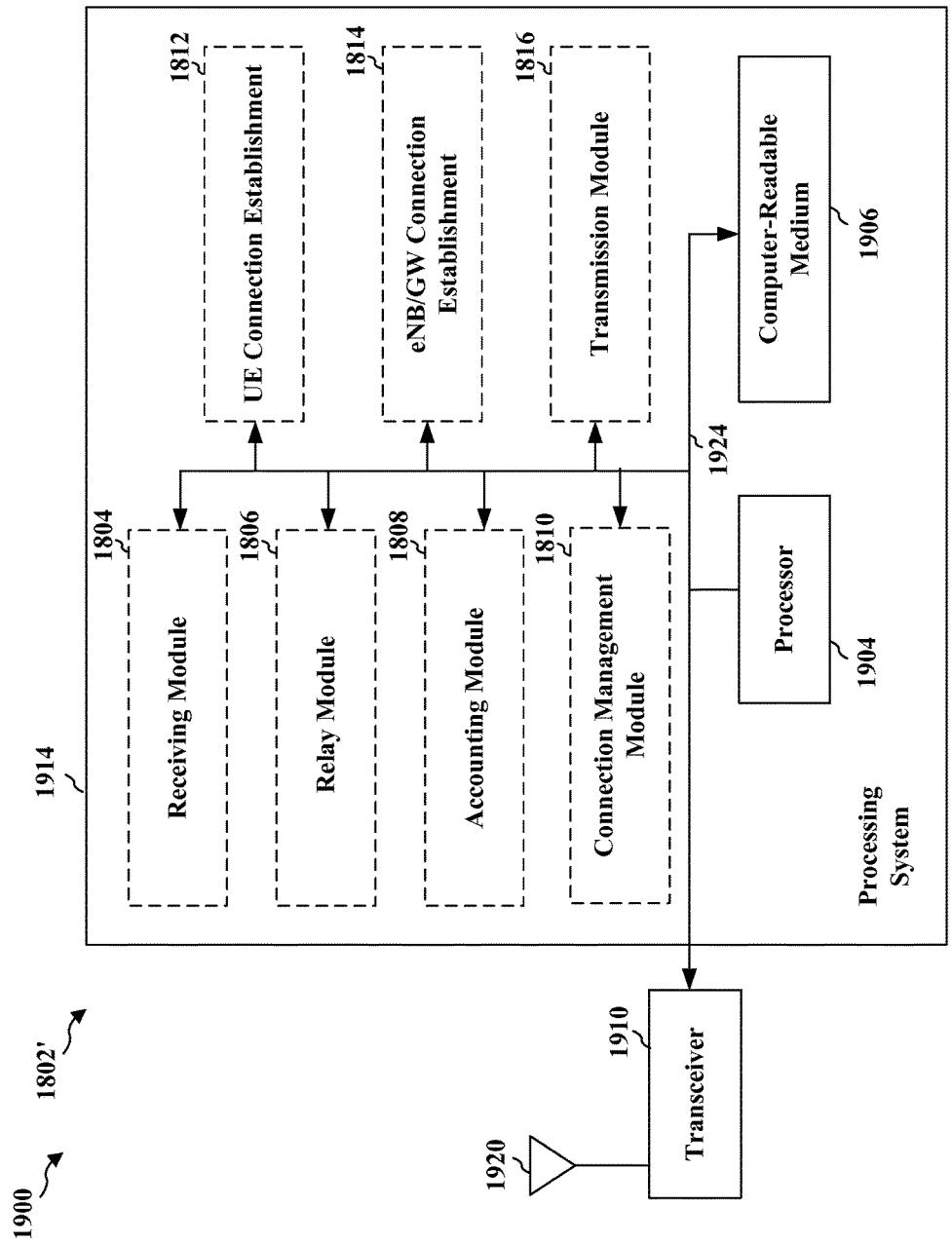
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1804, 1806, 1808, 1810, 1812, 1814, 1816, and the computer-readable medium 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The processing system 1914 includes a processor 1904 coupled to a computer-readable medium 1906. The processor 1904 is responsible for general processing, including the execution of software stored on the computer-readable medium 1906. The software, when executed by the processor 1904, causes the processing system 1914 to perform the various functions described supra for any particular apparatus. The computer-readable medium 1906 may also be used for storing data that is manipulated by the processor 1904 when executing software. The processing system further includes at least one of the modules 1804, 1806, 1808, 1810, 1812, 1814, and 1816. The modules may be software modules running in the processor 1904, resident/stored in the computer readable medium 1906, one or more hardware modules coupled to the processor 1904, or some combination thereof. The processing system 1914, or certain elements thereof, may be a component of the eNB 610 and may include the memory 676 and/or at least one of the TX processor 616, the RX processor 670, and the controller/processor 675. The processing system 1914, or certain elements thereof, may be a component of the UE 650 and may include the memory 660 and/or at least one of the TX processor 668, the RX processor 656, and the controller/processor 659.

In one configuration, the apparatus 1802/1802' for wireless communication includes means 1812 for establishing a connection with a TUE while connected to a PDN through a collocated UE, means 1814 for establishing or modifying a connection with a gateway, means 1806 for relaying data between the TUE and the PDN using the established or modified connection with the gateway, means 1808 for allocating charges to the TUE based on the data relayed between the TUE and the PDN, means 1804 for receiving data, means 1816 for transmitting data and means 1810 for managing connection establishment means 1812 and 1814.

The aforementioned means may be one or more of the aforementioned modules of the apparatus 1802 and/or the processing system 1914 of the apparatus 1802' configured to perform the functions recited by the aforementioned means. As described supra, the processing system 1914 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

In another configuration, the aforementioned means may be one or more of the aforementioned modules of the apparatus 1802 and/or the processing system 1914 of the apparatus 1802' configured to perform the functions recited by the aforementioned means. As described supra, the processing system 1914 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 20:
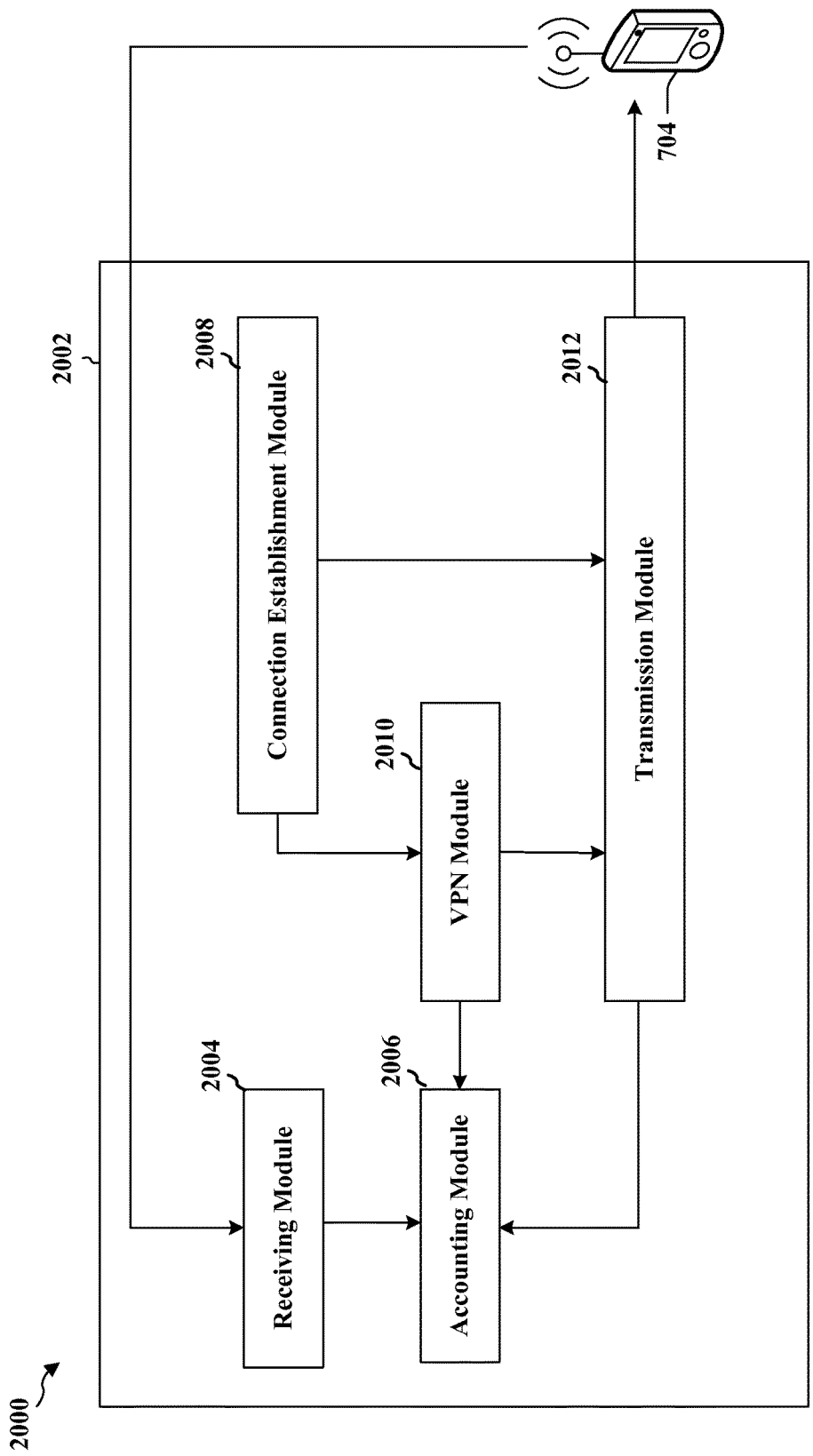
FIG. 20 is a conceptual data flow diagram illustrating the data flow between different modules/means/components in an exemplary apparatus.

FIG. 20 is a conceptual data flow diagram 2000 illustrating the data flow between different modules/means/components in an exemplary apparatus 2002. The apparatus may be a TUE 714. The apparatus includes a module 2004 that receives data from a UeNB 704, a module 2012 that transmits data to the UeNB 704, a module 2006 that provides information used to allocate charges for received and transmitted data, a module 2008 that establishes connections with one or more network entities, and a module 2010 that manages VPN connections.

The apparatus may include additional modules that perform each of the steps of the algorithm in the aforementioned flow chart of FIG. 15. As such, each step in the aforementioned flow chart of FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 21:
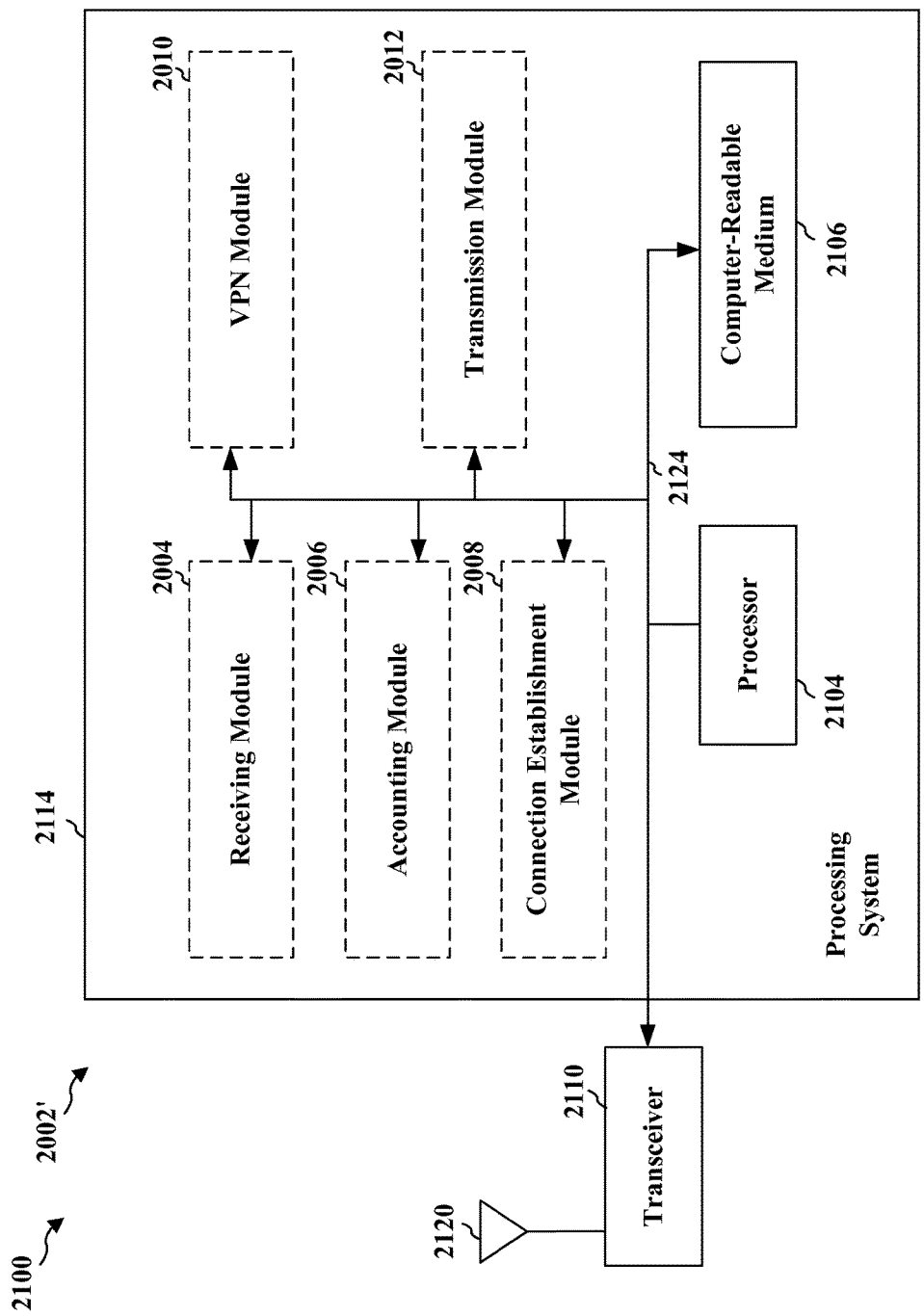
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2104, the modules 2004, 2006, 2008, 2010, 2012, and the computer-readable medium 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The processing system 2114 includes a processor 2104 coupled to a computer-readable medium 2106. The processor 2104 is responsible for general processing, including the execution of software stored on the computer-readable medium 2106. The software, when executed by the processor 2104, causes the processing system 2114 to perform the various functions described supra for any particular apparatus. The computer-readable medium 2106 may also be used for storing data that is manipulated by the processor 2104 when executing software. The processing system further includes at least one of the modules 2004, 2006, 2008, 2010, and 2012. The modules may be software modules running in the processor 2104, resident/stored in the computer readable medium 2106, one or more hardware modules coupled to the processor 2104, or some combination thereof. The processing system 2114 may be a component of the UE 650 and may include the memory 660 and/or at least one of the TX processor 668, the RX processor 656, and the controller/processor 659.

In one configuration, the apparatus 2002/2002' for wireless communication includes means 2008 for establishing a connection with a first eNB, means 2010 for establishing a virtual private network (VPN) connection with a gateway when the first eNB relays data to a second eNB, means 2006 for optionally identifying data transfers subject to PDN data charges, means 2012 for transmitting data, and means 2004 for receiving data.

The aforementioned means may be one or more of the aforementioned modules of the apparatus 2002 and/or the processing system 2114 of the apparatus 2002' configured to perform the functions recited by the aforementioned means. As described supra, the processing system 2114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
establishing a wireless communication with a Terminal User Equipment (TUE), wherein the UE provides a packet data network (PDN) connection to a packet data gateway (PGW) for the TUE;
identifying the TUE based on a traffic flow template (TFT) to determine an identifier associated with the TUE;
identifying a service flow corresponding to the TFT by the identifier, wherein the service flow associated with the identifier is charged based on the identifier;
sending a TUE information report by the UE directly to a mobility management entity (MME) identifying the TUE as having made the connection, wherein the TUE information report comprises information descriptive of the identifier and the associated service flow, wherein the information is further conveyed to the PGW in a request to modify bearer; and
receiving, by the UE in response to the request to modify bearer, a TUE information acknowledgement (ACK) message to enable charging for the TUE,
wherein the UE is provided a credit for communications relayed by the UE between the TUE and the PDN.

2. The method of claim 1, further comprising:
including the information in an information element (IE) of a non access stratum (NAS) message to the MME.

3. The method of claim 1, wherein identifying the TUE based on the TFT comprises:
determining the TUE using Internet Protocol (IP) header information of packet data corresponding to the TFT.

4. The method of claim 1, wherein the identifier is an international mobile subscriber identity (IMSI) of the TUE.

5. An apparatus for wireless communication, comprising:
means for establishing a wireless communication with a Terminal User Equipment (TUE), wherein a user equipment (UE) provides a packet data network (PDN) connection to a packet data gateway (PGW) for the TUE;
means for identifying the TUE based on a traffic flow template (TFT) to determine an identifier associated with the TUE;
means for identifying a service flow corresponding to the TFT by the identifier, wherein the service flow associated with the identifier is charged based on the identifier;
means for sending a TUE information report by the UE directly to a mobility management entity (MME) identifying the TUE as having made the connection, wherein the TUE information report comprises information descriptive of the identifier and the associated service flow, wherein the information is further conveyed to the PGW in a request to modify bearer; and
means for receiving, by the UE in response to the request to modify bearer, a TUE information acknowledgement (ACK) message to enable charging for the TUE,
wherein the UE is provided a credit for communications relayed by the UE between the TUE and the PDN.

6. The apparatus of claim 5, wherein the information is included in an information element (IE) of a non access stratum (NAS) message to the MME.

7. The apparatus of claim 5, wherein means for identifying the TUE based on the TFT comprises:
means for determining the TUE using Internet Protocol (IP) header information of packet data corresponding to the TFT.

8. The apparatus of claim 5, wherein the identifier is an international mobile subscriber identity (IMSI) of the TUE.

9. An apparatus for wireless communication, comprising:
a memory; and
at least one processor coupled to the memory and configured to:
establish a wireless communication with a Terminal User Equipment (TUE), wherein a user equipment (UE) provides a packet data network (PDN) connection to a packet data gateway (PGW) for the TUE;
identify the TUE based on a traffic flow template (TFT) to determine an identifier associated with the TUE;
identify a service flow corresponding to the TFT by the identifier, wherein the service flow associated with the identifier is charged based on the identifier;
send a TUE information report by the UE directly to a mobility management entity (MME) identifying the TUE as having made the connection, wherein the report comprises information descriptive of the identifier and the associated service flow, wherein the information is further conveyed to the PGW in a request to modify bearer; and
receive, by the UE in response to the request to modify bearer, a TUE information acknowledgement (ACK) message to enable charging for the TUE,
wherein the UE is provided a credit for communications relayed by the UE between the TUE and the PDN.

10. The apparatus of claim 9, further comprising:
including the information in an information element (IE) of a non access stratum (NAS) message to the MME.

11. The apparatus of claim 9, wherein identifying the TUE based on the TFT comprises:
determining the TUE using Internet Protocol (IP) header information of packet data corresponding to the TFT.

12. The apparatus of claim 9, wherein the identifier is an international mobile subscriber identity (IMSI) of the TUE.

13. A non-transitory computer-readable medium storing computer executable code, comprising code to:
establish a wireless communication with a Terminal User Equipment (TUE), wherein a user equipment (UE) provides a packet data network (PDN) connection to a packet data gateway (PGW) for the TUE;
identify the TUE based on a traffic flow template (TFT) to determine an identifier associated with the TUE;
identify a service flow corresponding to the TFT by the identifier, wherein the service flow associated with the identifier is charged based on the identifier;
send a TUE information report by the UE directly to a mobility management entity (MME) identifying the TUE as having made the connection, wherein the report comprises information descriptive of the identifier and the associated service flow, wherein the information is further conveyed to the PGW in a request to modify bearer; and
receive, by the UE in response to the request to modify bearer, a TUE information acknowledgement (ACK) message to enable charging for the TUE, wherein the UE is provided a credit for communications relayed by the UE between the TUE and the PDN.

14. The non-transitory computer-readable medium of claim 13, further comprising code to:
include the information in an information element (IE) of a non access stratum (NAS) message to the MME.

15. The non-transitory computer-readable medium of claim 13, wherein the code to identify the TUE based on the TFT comprises code to:
determine the TUE using Internet Protocol (IP) header information of packet data corresponding to the TFT.

16. The non-transitory computer-readable medium of claim 13, wherein the identifier is an international mobile subscriber identity (IMSI) of the TUE.

* * * * *